US010317034B2

(12) United States Patent
Tessnow et al.

(10) Patent No.: US 10,317,034 B2
(45) Date of Patent: Jun. 11, 2019

(54) INTEGRATED AUTOMOTIVE ADAPTIVE DRIVING BEAM HEADLAMP AND CALIBRATION METHOD

(71) Applicants: Thomas Tessnow, Weare, NH (US); Patrick Bittman, Concord, NH (US)

(72) Inventors: Thomas Tessnow, Weare, NH (US); Patrick Bittman, Concord, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/795,052

(22) Filed: Oct. 26, 2017

(65) Prior Publication Data

US 2019/0128497 A1  May 2, 2019

(51) Int. Cl.
*F21S 41/663* (2018.01)
*F21V 23/06* (2006.01)
(Continued)

(52) U.S. Cl.
CPC .............. *F21S 41/663* (2018.01); *B60Q 1/06* (2013.01); *B60Q 1/143* (2013.01); *F21S 41/141* (2018.01);
(Continued)

(58) Field of Classification Search
CPC ........ B60Q 1/114; B60Q 1/085; B60Q 1/143; B60Q 1/0023; B60Q 1/0035;
(Continued)

(56) References Cited

U.S. PATENT DOCUMENTS 8,729,803 B2 5/2014 Yamazaki et al.
9,140,424 B2 9/2015 Mochizuki et al.
(Continued)

FOREIGN PATENT DOCUMENTS

DE 10 2008 032 345 A1 1/2010
DE 10 2012 004817 A1 9/2013
(Continued)

OTHER PUBLICATIONS

Schoettle, et al., "LEDs and Power Consumption of Exterior Automotive Lighting: Implications for Gasoline and Electric Vehicles", University of Michigan, Transportation Research Institute, UMTRI-2008-48, Oct. 2008 (23 pages).
(Continued)

*Primary Examiner* — Haissa Philogene
(74) *Attorney, Agent, or Firm* — Edward S. Podszus

(57) ABSTRACT

An automotive adaptive driving beam (ADB) headlamp (20) includes a housing (22), a digital camera (32), an ADB controller (28), a segmented lighting array (24), and an ADB driver (30), wherein the digital camera (32) is integral with the ADB headlamp (20). The housing (22) includes an attachment structure (34) for attachment to a vehicle headlamp cavity (15). The digital camera (32) captures an image preceding the vehicle (2) and the ADB controller (28) detects an object (48) in the image and generates a control signal based, at least in part, on a position of the object (48). The segmented lighting array (24) is disposed within the housing (22) and includes a plurality of solid-state light sources (40*a-n*) arranged to emit a light in a light distribution pattern (26). The ADB driver (30) selectively drives the solid-state light sources (40*a-n*) based on the control signal from the ADB controller (28).

40 Claims, 15 Drawing Sheets

(51) Int. Cl.
*H05B 33/08* (2006.01)
*B60Q 1/06* (2006.01)
*B60Q 1/14* (2006.01)
*F21S 41/141* (2018.01)
*F21Y 115/10* (2016.01)

(52) U.S. Cl.
CPC ............ *F21V 23/06* (2013.01); *H05B 33/083* (2013.01); *H05B 33/0854* (2013.01); *B60Q 2300/05* (2013.01); *F21Y 2115/10* (2016.08)

(58) Field of Classification Search
CPC .............. B60Q 1/0047; B60Q 2200/38; B60Q 2900/10; B60Q 2300/41; B60Q 2300/45; F21S 45/49; F21S 43/27; F21S 43/13; F21S 43/19; F21S 41/143; F21S 48/1742; F21S 41/00; F21S 41/16
See application file for complete search history.

(56) References Cited

U.S. PATENT DOCUMENTS

| | | | |
|---|---|---|---|
| 9,303,836 B2 * | 4/2016 | Okamoto | F21S 48/1742 |
| 9,738,214 B2 | 8/2017 | Nakatani | |
| 9,739,439 B2 * | 8/2017 | Landcastle | F21S 48/1241 |
| 9,878,655 B2 * | 1/2018 | Tanaka | B60Q 1/085 |
| 9,903,557 B2 * | 2/2018 | Matsuno | F21S 41/24 |
| 2001/0019486 A1 | 9/2001 | Thominet | |
| 2003/0137849 A1 | 7/2003 | Alden | |
| 2007/0002571 A1 | 1/2007 | Cejnek et al. | |
| 2009/0141513 A1 | 6/2009 | Kim | |
| 2009/0279317 A1 | 11/2009 | Tatara | |
| 2013/0076240 A1 | 3/2013 | Endo | |
| 2015/0042225 A1 | 2/2015 | Fukayama | |
| 2016/0257241 A1 | 9/2016 | Hoffmann | |
| 2017/0267162 A1 | 9/2017 | Remillard | |
| 2018/0170240 A1 * | 6/2018 | Wama | B60Q 1/0023 |

FOREIGN PATENT DOCUMENTS

| | | |
|---|---|---|
| DE | 10 2015 203889 A1 | 9/2016 |
| JP | 2014 121895 | 7/2014 |

OTHER PUBLICATIONS

Machine translation of JP appln. 2014 121895A supplied by EPO in corresponding PCT Search Report (9 pp).
English abstract of DE 10 2012 004817 obtained from espacenet database (1 p.).
English abstract of DE 10 2015 203889 obtained from espacenet database (1 p.).
English abstract of DE 10 2008 032345 obtained from espacenet database (1 p.).

* cited by examiner

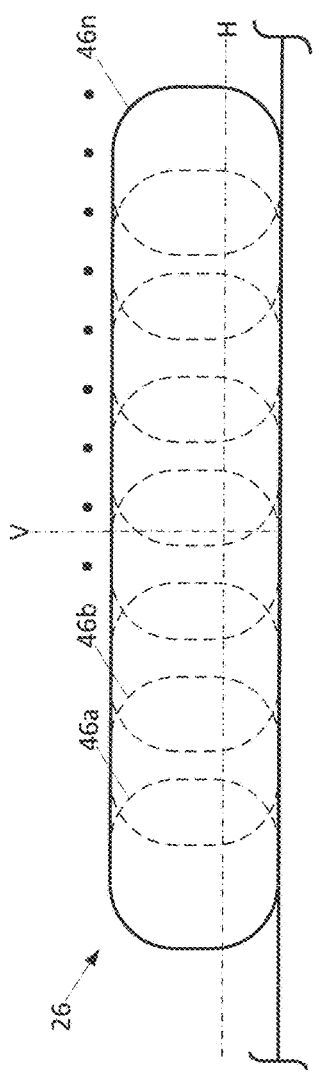
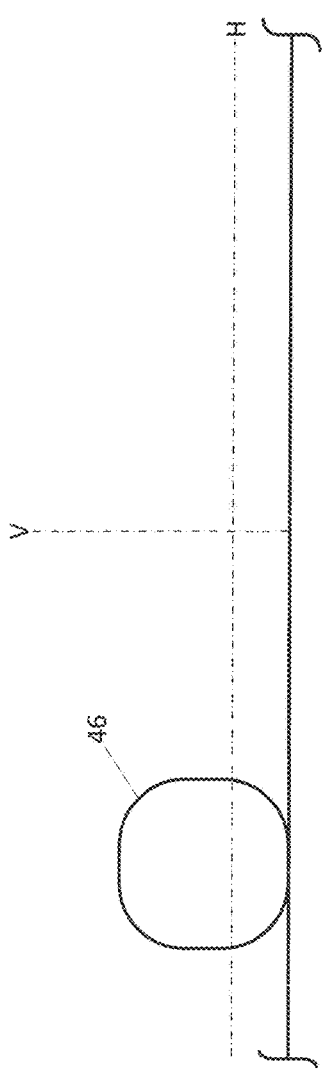
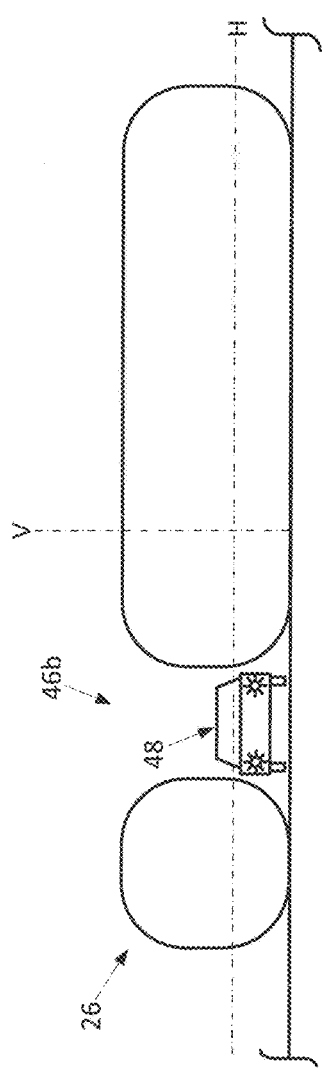

93

Repeat for each zone/illumination region:
- Turn off all solid state light sources
- Turn on only the solid state light source(s) associated with zone
- Capture image
- Find left edge (first column with enough bright pixels)
- Find right edge (first column after left edge without enough bright pixels)
- Save left and right edge pixel number for zone

FIG. 17

INTEGRATED AUTOMOTIVE ADAPTIVE DRIVING BEAM HEADLAMP AND CALIBRATION METHOD

STATEMENT REGARDING FEDERALLY SPONSORED RESEARCH OR DEVELOPMENT

N/A

TECHNICAL FIELD

The present application relates to automotive headlamps and more particularly to headlamps having improved adaptive driving beam performance and calibration method.

BACKGROUND

Lighting systems (such as headlights) are well-known and are used in a wide variety of applications, including automotive applications, and include one or more projector apparatus for emitting one or more distinct light patterns. For example, headlamps may be capable of emitting light in a low-beam pattern/mode in which light is generally emitted below the horizon, and a high beam pattern/mode in which light is generally emitted above and below the horizon.

A known type of automotive headlamps includes adaptive driving beam (ADB) headlamp systems. ADB headlamp systems are a long-range forward visibility beam that adapt to the presence of opposing and preceding vehicles by modifying portions of its beam pattern to avoid glare above lower beam photometry levels to the drivers of opposing and preceding vehicles. Since the 1960's, studies based on surveys throughout the United States have shown that drivers even in "open road" situations (neither following nor meeting another vehicles), switched their headlights to high beam mode too infrequently, and thus do not take advantage of the longer-range visibility that high beam offers. For example, a study by the University of Michigan Transportation Research Institute (UMTRI-2008-48, October 2008) reported average usage data on U.S. passenger vehicles that showed high beam usage at only about a tenth of low beam usage, with low beam at about 97 hours/year but high beam usage at only 9.8 hours/year. The automatic ADB offers a convenient system that could result in increased safety-beneficial upper beam use.

One embodiment of a known ADB headlamp system is generally illustrated in FIGS. 1-2. In particular, FIG. 1 is a block diagram showing schematically the structure of a prior art ADB headlamp system 1 and FIG. 2 is a schematic illustration showing the prior art ADB headlamp system 1 installed in a vehicle 2. The prior art ADB headlamp system 1 includes a headlamp 3, a vehicle on-board camera 4, and an ADB controller 5 electrically coupled to each other by way of a vehicle CAN-bus, LIN-bus, or similar vehicle bus (hereinafter generally referred to as CAN-bus 6). Other vehicle sensors/controllers 7 (such as, but not limited to, an electronic control unit (ECU), engine control module (ECM), sensors, and/or the like) may also be electrically coupled to the CAN-bus 6.

Known vehicle on-board camera 4 includes camera housing 8 configured to be attached within the cabin 9 of vehicle 2, conventionally proximate windshield 23 and/or rear view mirror 11 of vehicle 2. The vehicle on-board camera 4 is configured to generate an image based on received light 12 and to transmit the captured image to ADB controller 5 by way of a camera interface 10 electrically coupled to CAN-bus 6. ADB controller 5 receives the image captured by vehicle on-board camera 4, detects an object within the image, determines the position of the detected object within a beam pattern 13 generated by the headlamp 3, and generates one or more control signals that are transmitted to headlamp 3 across CAN-bus 6.

The headlamp 3 includes a headlamp housing 14 configured to be attached to a headlamp cavity 15 of the vehicle 2 (e.g., proximate the front 16 of the vehicle 2). The headlamp 3 also includes one or more light sources (such as light emitting diodes LEDs) and optics 17 configured to emit light in one or more patterns 13 (such as a high-beam mode as discussed above). A headlamp interface 18 receives the control signals from the ADB controller 5 across the CAN-bus 6 and is configured to control the driver circuitry 19 to selectively illuminate one or more LEDs/optics 17 to change the beam pattern 13 based on the position of the detected object relative to the beam pattern 13 and/or headlamp 3. Examples of known headlamp systems may be found, for example, in US Pat. Pub. Nos. 2009/0279317 (Tatara), 2009/0141513 (Kim); 2001/0019486 (Thominet); 2007/0002571 (Cejnek); 2003/0137849 (Alden); and 2015/0042225 (Fukayama), as well as U.S. Pat. No. 9,738,214 (Nakatani); U.S. Pat. No. 9,140,424 (Mochizuki); and U.S. Pat. No. 8,729,803 (Yamazaki).

While the known ADB headlamp systems 1 are generally effective, they suffer from several disadvantages. For example, the on-board vehicle camera 4, ADB controller 5, and headlamp 3 are electrically coupled by way of the vehicle CAN-bus 6. As a result, the known ADB headlamp systems 1 cannot be easily retrofitted into existing vehicles 2 unless the vehicle CAN-bus 6 was originally designed for an ADB headlamp system 1. In addition, the on-board vehicle camera 4 and the headlamp 3 are not mechanically connected and need to be physically aligned to each other and the vehicle 2 after the ADB headlamp system 1 has been installed in the vehicle 2. As a result, the ADB controller 5 cannot be calibrated until after the ADB headlamp system 1 has been installed in the vehicle 2.

Because the ADB controller 5 cannot be calibrated until after the ADB headlamp system 1 has been installed in the vehicle 2, the known ADB headlamp system 1 must be calibrated by the vehicle manufacturer. In particular, the known methods of calibrating ADB controllers 5 require the vehicle 2 to be removed from the main vehicle assembly line and transported into a calibration area after the ADB headlamp system 1 has been installed in the vehicle 2. Once the vehicle 2 is in the calibration area, subsets of the LEDs/optics 17 of the headlamp 3 may be selectively illuminated, images of the illumination region associated with each subset of LEDs/optics 17 may be captured, and the pixel boundaries of the illumination regions associated with each of the subset of LEDs/optics 17 may be determined. The position of the on-board vehicle camera 4 relative to the headlamp 3 and the vehicle 2 may then be precisely aligned.

As a result, the known calibration method requires additional space in the manufacturing facility, thereby increasing manufacturing costs of the vehicle 2. Moreover, since the vehicle 2 must be removed from the main vehicle assembly line and transported into a calibration area, the length, complexity, and manufacturing costs of the vehicle 2 is increased. In addition, the known calibration methods require the precise physical alignment of the on-board vehicle camera 4 relative to the headlamp 3 and the vehicle 2, thereby further increasing the length, complexity, and manufacturing costs of the vehicle 2.

BRIEF DESCRIPTION OF THE DRAWINGS

Reference should be made to the following detailed description which should be read in conjunction with the following figures, wherein like numerals represent like parts:

FIG. 6 illustrates a light distribution pattern embodiment of the present disclosure.

FIG. 7 illustrates one embodiment of an illumination region consistent with the present disclosure.

FIG. 8 illustrates one embodiment of a light distribution pattern consistent with the present disclosure in which the brightness of an illumination region corresponding to a position of a detected object has been reduced.

FIG. 17 illustrates one embodiment of a zone calibration algorithm consistent with the present disclosure.

DETAILED DESCRIPTION

In general, one embodiment of the present disclosure features an automotive adaptive driving beam (ADB) headlamp including a housing, a digital camera, an ADB controller, a segmented lighting array, and an ADB driver, wherein the digital camera is integral with the ADB headlamp. The housing includes an attachment structure for attachment to a vehicle headlamp cavity. The digital camera captures an image preceding the vehicle and the ADB controller detects an object in the image and generates a control signal based, at least in part, on a position of the object. The segmented lighting array is disposed within the housing and includes a plurality of solid-state light sources arranged to emit a light in a light distribution pattern. The ADB driver selectively drives the solid-state light sources based on the control signal from the ADB controller.

Because the digital camera is integral with the ADB headlamp, an ADB headlamp consistent with the present disclosure does not have to be electrically coupled to a vehicle CAN-bus. As a result, an ADB headlamp consistent with the present disclosure may be retrofitted into vehicles that either do not have a vehicle CAN-bus or vehicles that have a vehicle CAN-bus which was not designed to work with an ADB headlamp.

In addition, because the digital camera is integral with the ADB headlamp, the position of the digital camera is fixed relative to the segmented lighting array and the housing. As a result, the ADB controller may perform calibration of the ADB headlamp prior to the ADB headlamp being attached to the headlamp cavity of the vehicle. Because an ADB headlamp consistent with the present disclosure can be calibrated prior to the ADB headlamp being attached to the headlamp cavity of the vehicle, the ADB headlamp can be calibrated by the manufacturer of the ADB headlamp rather than the manufacturer of the vehicle, thus eliminating the need to remove the vehicle from the main vehicle assembly line and transport the vehicle into a calibration area in order to perform calibration of the ADB headlamp. As a result, the manufacturing costs of the vehicle may be reduced since the additional space in the vehicle manufacturing facility may be eliminated. Moreover, since the vehicle does not need to be removed from the main vehicle assembly line and transported into a calibration area, the length, complexity, and manufacturing costs of the vehicle is decreased compared to the known calibration method and ADB headlamp systems.

Figure 3:
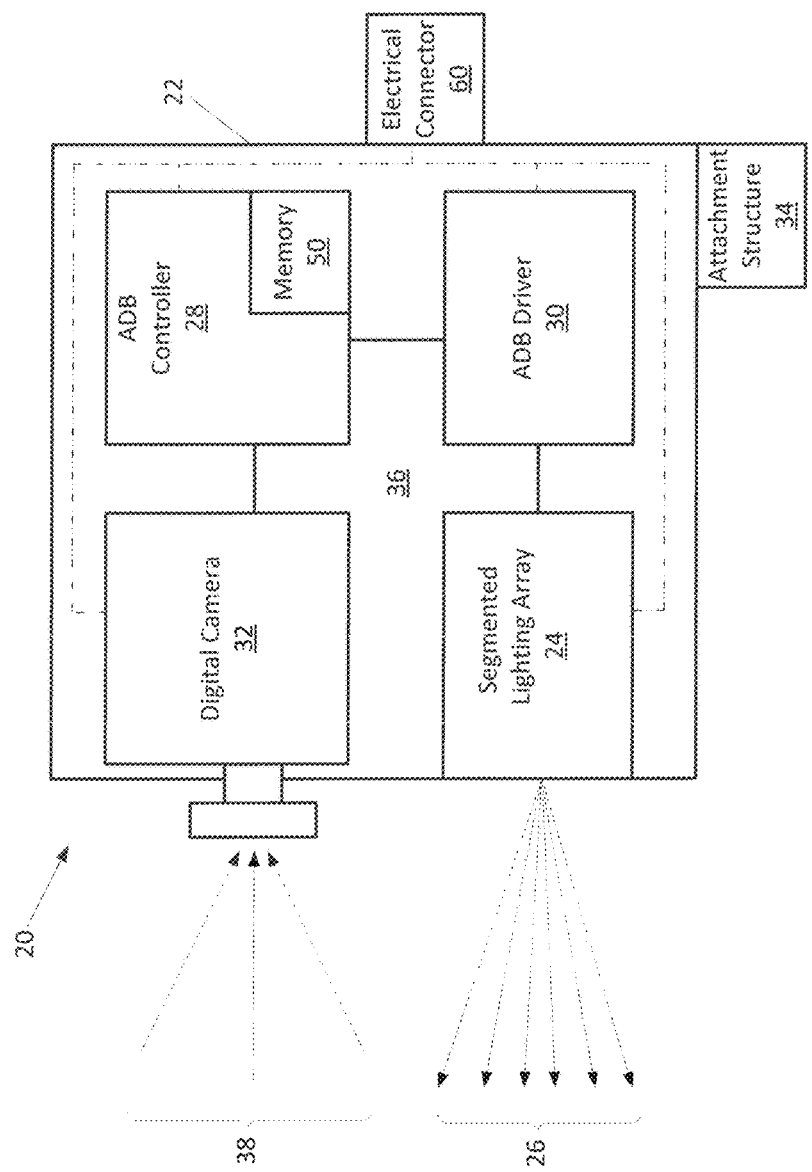
FIG. 3 is a block diagram showing schematically an ADB headlamp consistent with one embodiment of the present disclosure.
Figure 4:
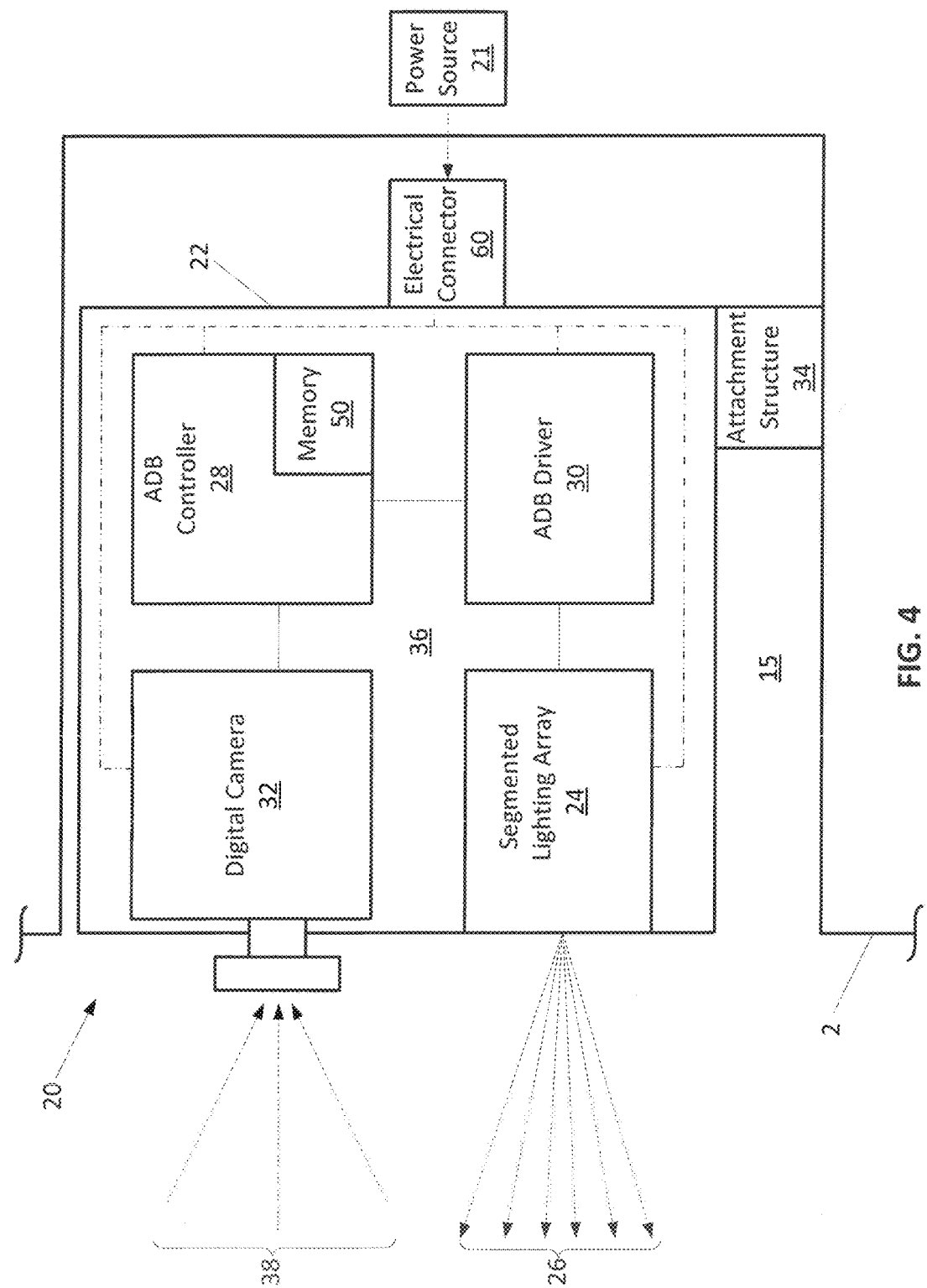
FIG. 4 is a schematic illustration showing the ADB headlamp of FIG. 3 installed in a headlamp cavity of a vehicle.

Turning now to FIGS. 3-4, one embodiment of an adaptive driving beam (ADB) headlamp 20 consistent with the present disclosure is generally illustrated. In particular, FIG. 3 is a block diagram showing schematically the ADB headlamp 20 and FIG. 4 is a schematic illustration showing the ADB headlamp 20 installed in a headlamp cavity 15 of a vehicle 2. The ADB headlamp 20 includes a housing 22, a segmented lighting array 24 disposed within the housing 22 and configured to emit a light in a light distribution pattern 26, an adaptive driving beam (ADB) controller 28, an ADB driver 30, and a digital camera 32 integral with the ADB headlamp 20. As described herein, the ADB headlamp 20 is configured to detect at least one object in an image captured by the digital camera 32 and the ADB controller 28 is configured to generate one or more control signals to selectively drive the segmented lighting array 24 based, at least in part, on a position of the detected object. As a result, the light distribution pattern 26 generated by the ADB headlamp 20 may be adjusted, for example, to attenuate light in one or more illumination regions of the light distribution pattern, thereby reducing and/or eliminating glare to traffic and/or pedestrians.

The housing 22 includes an attachment structure 34 configured for attachment to a headlamp cavity 15 of a vehicle 2 as generally illustrated in FIG. 4. The attachment structure 34 includes any suitable structure for mounting, coupling, and/or otherwise securing the housing 22 to the headlamp cavity 15 of the vehicle 2, and may permit adjustable mounting to facilitate aiming of the ADB headlamp 20, for example, as known in the art. Non-exhaustive examples of suitable attachment structure 34 include tabs, apertures, slots, grooves, lips, flanges, and/or protrusions. The attachment structure 34 may also be used in combination with one or more fasteners including, but not limited to, bolts, screws, clamps, rivets, clasps, or the like. The housing 22 may form one or more cavities and/or chambers 36. The cavities and/or chambers 36 may be completely or partially enclosed by the housing 22.

The digital camera 32 is configured to capture light 38 in a region preceding the vehicle 2 and generate a digital image. The digital camera 32 may include any known type of digital camera including digital cameras configured to operate in the visible light spectrum (including only white visible light and/or one or more other colors of visible light) and/or infrared light (IR) spectrum. For exemplary purposes only, the digital camera 32 used in various tests was an OV7670 digital camera 32 commercially available from a variety of manufacturers.

Figure 2:
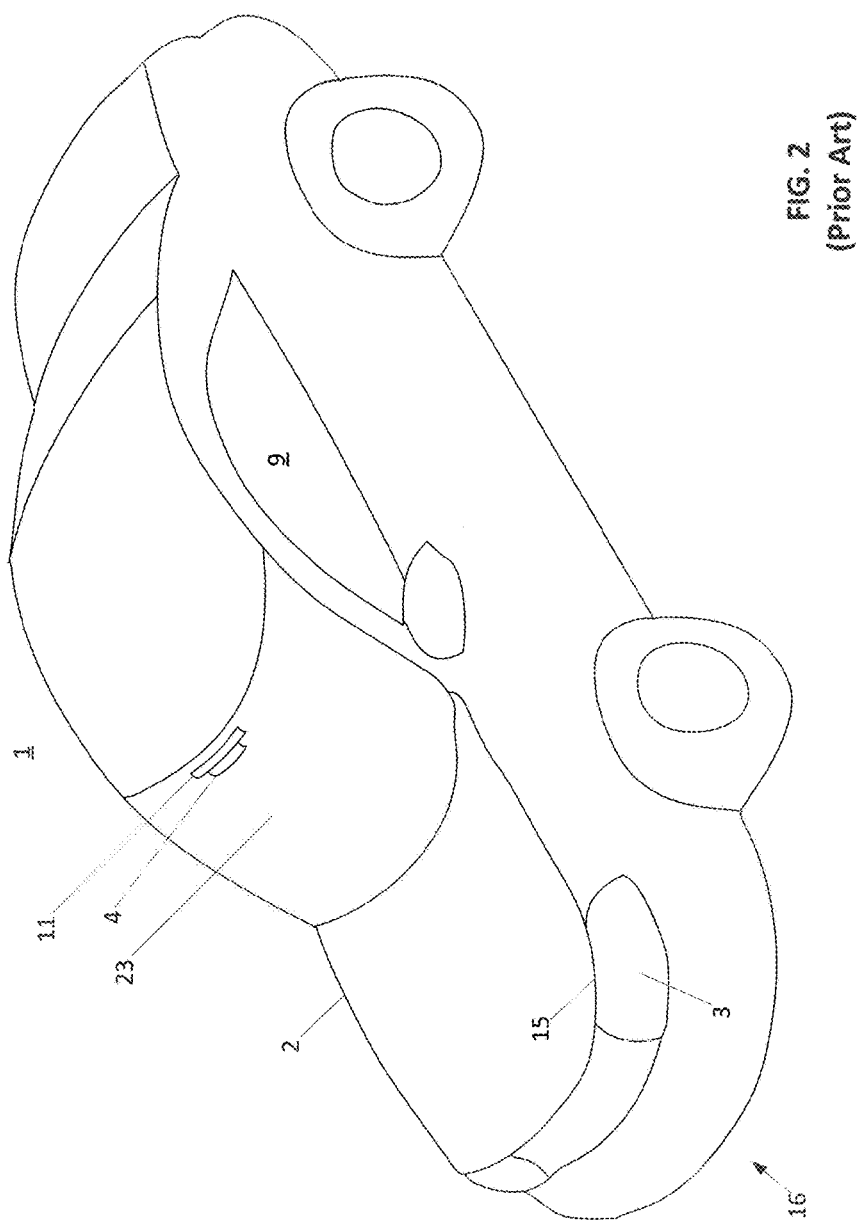
FIG. 2 schematically illustrates a FIG. 1 prior art ADB system installed in a vehicle.

As noted above and illustrated in FIG. 3, the digital camera 32 is integral with the ADB headlamp 20. As used herein, the term "integral" is intended to mean that the digital camera 32 is formed as a unit with the ADB headlamp 20. The term "integral" does not require the digital camera 32 to be one piece with the ADB headlamp 20. By way of example, the digital camera 32 is considered to be integral with the ADB headlamp 20 when the digital camera 32 is disposed at least partially in housing 22 (e.g., disposed at least partially in one or more of the cavities and/or chambers 36 formed by the housing 22) and/or when the digital camera 32 is supported by the housing 22 (e.g., the digital camera 32 is either permanently or removably secured to an internal and/or external surface of the housing 22 in a manner that does not require the ADB headlamp 20 to be attached to a vehicle 2). Because the digital camera 32 is integral with the ADB headlamp 20, a position of the digital camera 32 is fixed relative to the segmented lighting array 24 and the housing 22 independent of the housing 22 being attached to the headlamp cavity 15 of the vehicle 2. The phrase "the digital camera is integral with the ADB headlamp" and the like does not encompass a digital camera 4 mounted within the cabin 9 of the vehicle 2 (e.g., proximate the windshield 23 and/or rear view mirror 11 of the vehicle 2), which as conventionally known would require communication over the CAN-bus line 6, as generally illustrated in FIG. 2. Therefore, digital camera 32 is located external to cabin 9 of vehicle 2.

Figure 5:
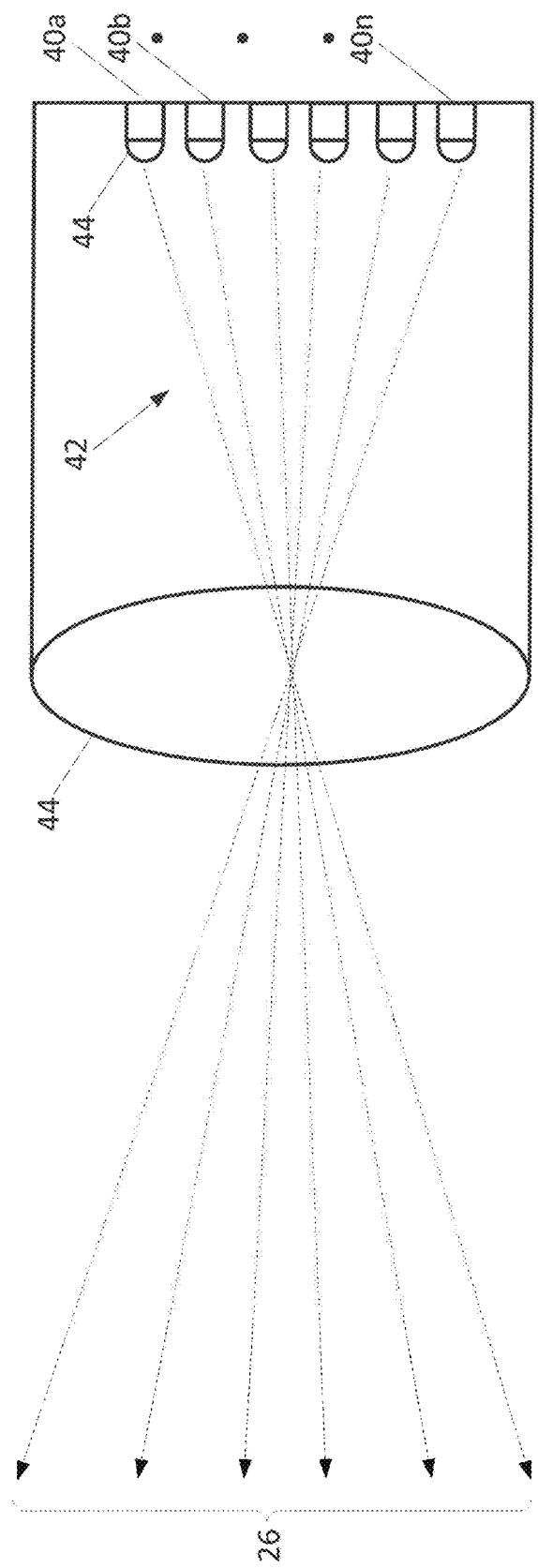
FIG. 5 illustrates a segmented lighting array embodiment of the present disclosure.

The segmented lighting array 24 is disposed within the housing 22 (for example, but not limited to, in one or more of the cavities and/or chambers 36 formed by the housing 22) and is configured to emit light in one or more light distribution patterns 26 (such as, but not limited to, a low-beam light pattern, a high-beam light pattern, and/or a modification thereof). One embodiment of a segmented lighting array 24 consistent with the present disclosure is generally illustrated in FIG. 5. In particular, the segmented lighting array 24 includes a plurality of solid-state light sources 40a-n each configured to emit light 42. In the illustrated embodiment, the plurality of solid-state light sources 40a-n are arranged in a 1×N array (where N=6), though it should be appreciated that the plurality of solid-state light sources 40a-n may be arranged in one or more rows and/or columns such as, but not limited to, a 1×N array, an M×N array, or any combination thereof. In addition, while the plurality of solid-state light sources 40a-n are illustrated as being aligned in a generally linear manner, it should be appreciated that the plurality of solid-state light sources 40 may be arranged in a non-linear manner as well.

The solid-state light sources 40a-n include any type of semiconductor light-emitting diodes (LEDs), organic light-emitting diodes (OLED), or polymer light-emitting diodes (PLED) as a source of illumination. Light 42 emitted by the plurality of solid-state light sources 40a-n may be focused and/or directed by one or more optics 44 into more desired light patterns to be emitted from the ADB headlamp 20. The optics 44 (only two of which are labeled in FIG. 5 for clarity) may include any design known to those skilled in the art such as, but not limited to, lenses, diffusers, reflectors, and/or the like. The optics 44 may be coupled to the solid-state light sources 40a-n (e.g., but not limited to, one or more lenses supported by and/or on the solid-state light sources 40a-n) and/or to the ADB headlamp 20 (e.g., coupled to the housing 22).

The plurality of solid-state light sources 40a-n each emit light 42 which collectively forms one or more light distribution patterns 26. One exemplary light distribution pattern 26 consistent with the present disclosure is generally illustrated in FIG. 6. While not a limitation of the present disclosure unless specifically claimed, the light distribution pattern 26 may be a high-beam light pattern which is formed by a plurality of illumination regions 46a-n. As may be understood, a low beam pattern corresponds to light that is emitted generally under the horizontal line H (so as not to cause glare to oncoming vehicles) whereas a high beam pattern corresponds to light that is emitted above and below the horizontal line H.

Each illumination region 46a-n of the light distribution pattern 26 corresponds to and/or is associated with at least one of the plurality of solid-state light sources 40a-n and makes up a portion (e.g., zone and/or a vertical stripe) of the overall light distribution pattern 26. Each illumination region 46a-n may slightly overlap with an adjacent illumination region 46 so that all of the illumination regions 46a-n collectively form a homogenous wide high-beam light distribution pattern 26. An exemplary illumination region 46 is generally illustrated in FIG. 7. It should be appreciated that each illumination region 46 may be formed by a single solid-state light source 40 and/or a subset of the plurality of solid-state light sources 40a-n (i.e., one or more solid-state light sources 40a-n, but less than all of the solid-state light sources 40a-n). As explained herein, one or more of the solid-state light sources 40a-n may be selectively driven (i.e., selectively powered) to change and/or adjust the brightness of one or more of the illumination regions 46a-n and therefore change and/or adjust the light distribution pattern 26. For example, the solid-state light sources 40a-n corresponding to one or more illumination regions 46a-n that an object 48 is detected in (e.g., illumination region 46b in FIG. 8) may have its power attenuated (e.g., reduced and/or eliminated) to change and/or adjust brightness of the illumination region 46b and thereby changing and/or adjusting the light distribution pattern 26.

Turning back to FIGS. 3-4, the ADB controller 28 is configured to detect at least one object (e.g., object 48 in FIG. 8) in the image captured by the digital camera 32 and generate one or more control signals based, at least in part, on a position of the detected object 48. The ADB controller 28 includes circuitry such as one or more general purpose computers running software and/or application-specific integrated circuits (ASICs) having one or more processors and associated memory (such as, but not limited to, ROM, RAM, EEPROM, flash memory, or the like). For exemplary purposes only, the ADB controller 28 used in various tests was a Teensy 3.2 USB-based microcontroller commercially available from a variety of manufacturers.

The ADB controller 28 may perform image processing and detect object 48 in an image using any image recognition algorithm. It should be appreciated, however, that the ADB controller 28 does not have to be able to classify the type of object 48, but rather needs to be able to detect whether an object 48 is present in the captured image. In one embodiment, the ADB controller 28 may detect object 48 based on pixel brightness. For example, ADB controller 28 may compare the brightness of each pixel to a minimum pixel brightness threshold value stored in memory 50 associated with the ADB controller 28. If the number of pixels in the captured image exceeds a predetermined threshold (e.g., stored in the memory 50), the ADB controller 28 will determine that an object 48 exists in the captured image. Comparing the pixel brightness to a minimum pixel brightness threshold may reduce and/or eliminate the effects of reflected light that was originally emitted by the ADB headlamp 20 from causing false object detections.

Figure 9:
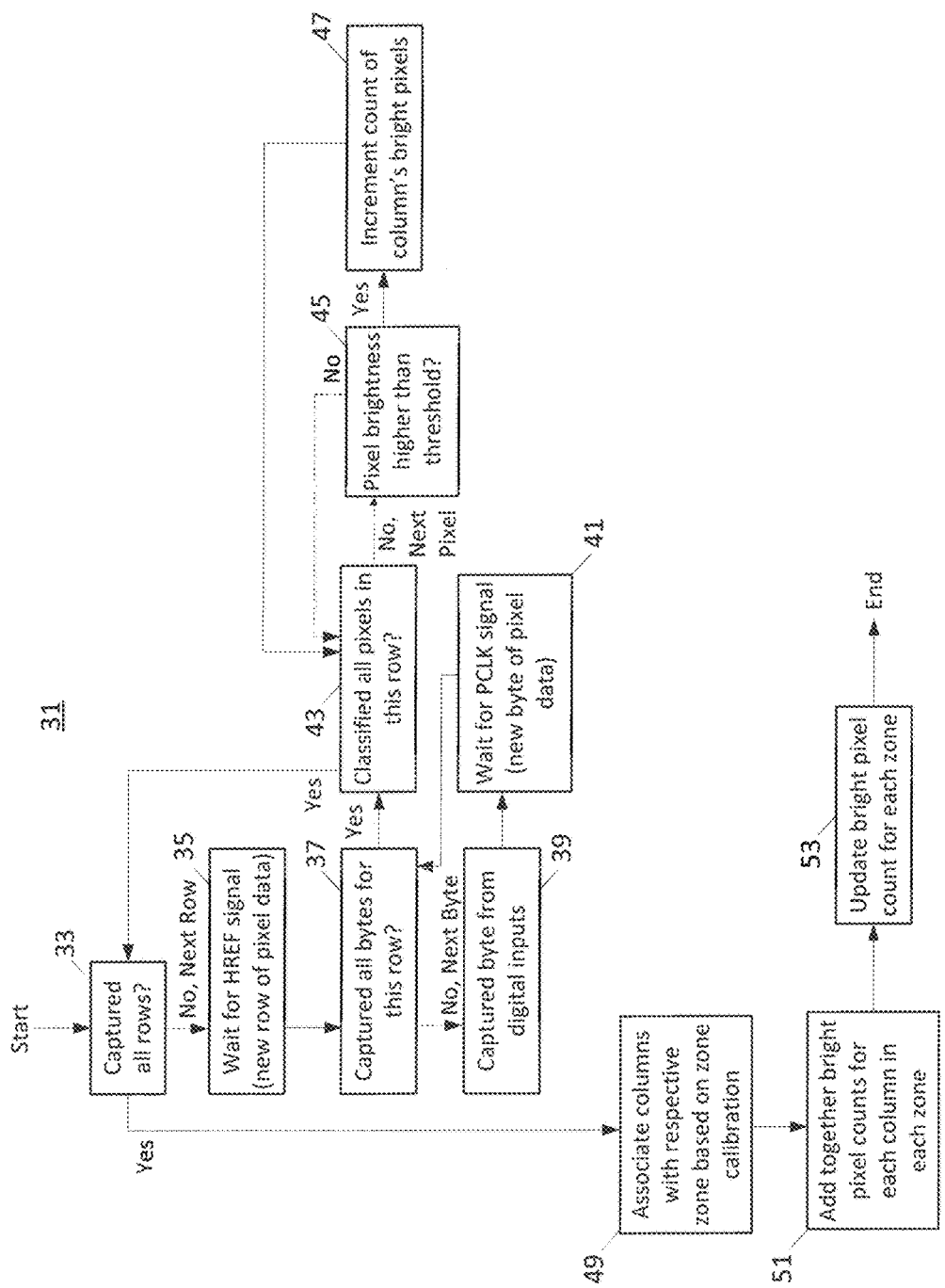
FIG. 9 illustrates one embodiment of an image capture algorithm performed by the ADB controller consistent with the present disclosure.

With reference to FIG. 9, one embodiment of an image capture algorithm 31 performed by the ADB controller 28 is generally illustrated. In particular, the image capture algorithm 31 is configured to determine a bright pixel count for each zone in the captured image (each zone corresponding to one of the plurality of illumination regions 46a-n). Once an image has been generated by the digital camera 32, the algorithm 31 determines whether the pixel data in all the rows in the image has been examined (step 33). If not, the algorithm 31 waits for a horizontal line reference (HREF) signal from the digital camera 32 indicative of a new row of pixel data (step 35), and in response to a new HREF signal, the algorithm 31 determines whether all bytes in the row have been captured (step 37), e.g., captured in memory 50. If all the bytes of the row have not been captured, the algorithm 31 captures the next byte from the digital input from the digital camera 32 (step 39), waits for a pixel clock (PCLK) signal from the digital camera 32 indicative of a new byte of pixel data (step 41), and then returns to step 37 to determine if all the bytes of the row have been captured. Put another way, the digital camera 32 sends one pixel at a time over the data lines to the ADB controller 28. For every byte, the pixel clock will send a signal to tell the ADB controller 28 that the byte is ready to read. The HREF signal turns on when the row starts and off when it is done. Then it turns on again for the next row of pixels. When connecting the digital camera 32 to the ADB controller 28, handshake signals like HREF and PCLK are transmitted.

Once all the bytes of the row have been captured, the algorithm 31 determines whether all the pixels in the row have been classified (step 43), and if not, the algorithm 31 classifies the next pixel in the row by determining whether the pixel brightness exceeds a pixel brightness threshold (step 45). If the pixel brightness is higher than the pixel threshold, then the algorithm 31 increments a count of a column's brightness pixels (step 47). If the pixel brightness is not higher than the pixel threshold, then the algorithm 31 returns to step 43 and again determines whether all the pixels in the row have been classified (step 43), and if yes, the algorithm 31 returns to step 33.

The algorithm 31 again determines whether the pixel data in all the rows in the image have been examined (step 33), and if so, the algorithm 31 associates the columns with a respective zone based on the zone calibration (step 49), e.g., using the left and right illumination pixel boundaries for each illumination regions 46a-n as described herein. The algorithm 31 then adds together the bright pixel counts for each column in each zone (step 51) and updates a bright pixel count for each zone (step 53), for example, in memory 50.

Thus, the goal of the image capture algorithm 31 is to read the pixels row by row and test if the pixels are bright enough and sort them into the appropriate column. The image capture algorithm 31 starts with the first row, waiting for HREF to turn on then read all pixels one by one. When all pixels of that row are read, then the image capture algorithm 31 looks at the value of each pixel and checks if it is above a threshold. If a pixel is above the threshold, the image capture algorithm 31 calculates in which column this pixels is and increases the bright-pixel-count for that column by 1.

Figure 10:
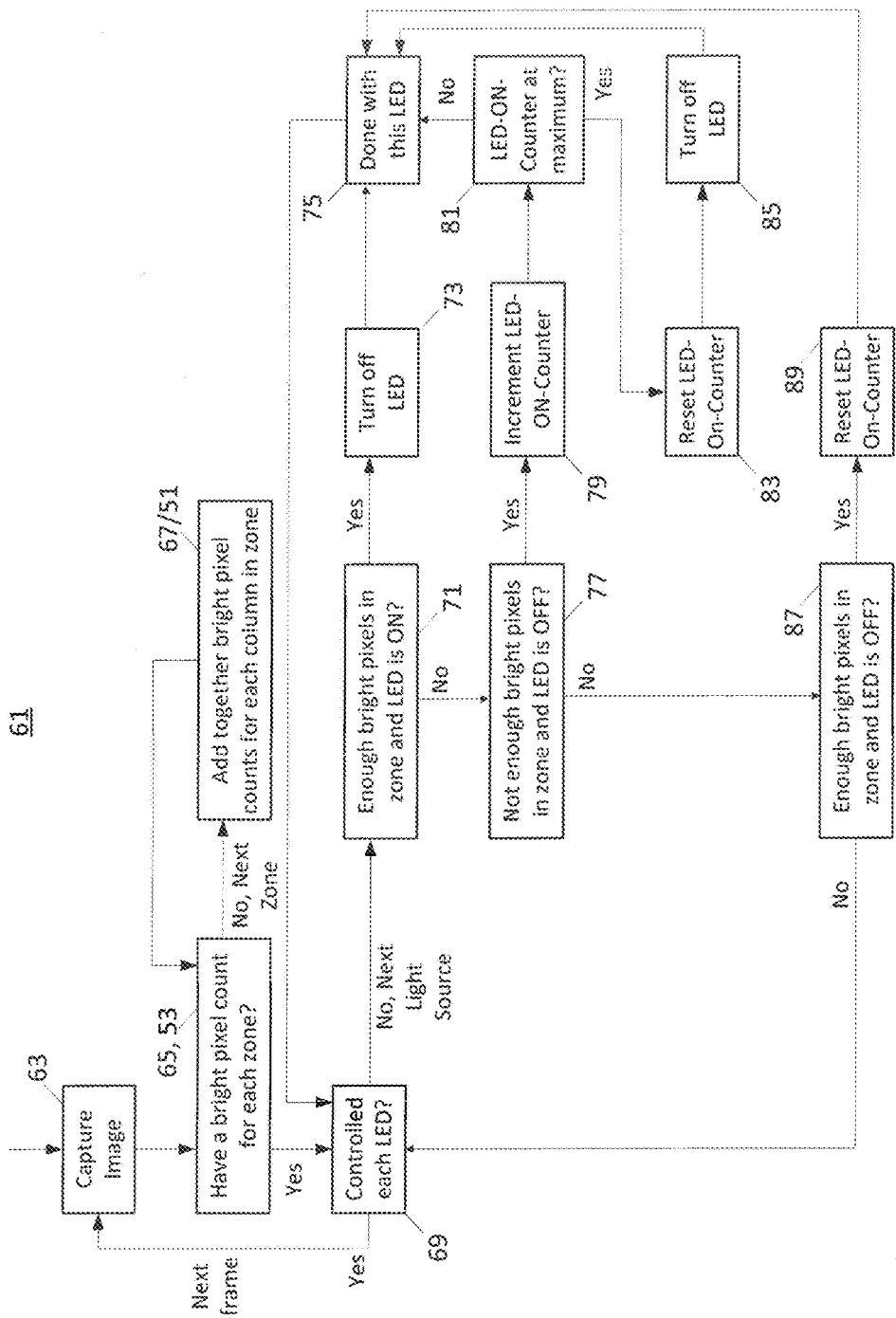
FIG. 10 illustrates one embodiment of an image processing and object detection algorithm performed by the ADB controller consistent with the present disclosure.

Turning now to FIG. 10, one embodiment of an image processing and object detection algorithm 61 performed by the ADB controller 28 is generally illustrated. The algorithm 61 begins after an image is captured (step 63). The algorithm 61 then determines whether a bright pixel count has been determined for each zone in the image (step 65), for example, as determined in step 53 of image capture algorithm 31 of FIG. 9. If a bright pixel count has not been determined for each zone in the image, then the algorithm 61 adds the bright pixel count for each column in the next zone (step 67), for example, as determined in step 51 of image capture algorithm 31 of FIG. 9. If a bright pixel count has been determined for each zone in the image, the algorithm 61 then determines whether each solid state light source 40a-n has been controlled (step 69). If yes, then the algorithm 61 processes the next captured image at step 63, and the algorithm 61 begins over again. If no, the algorithm 61 determines if there are enough bright pixels in a zone and whether the solid state light source(s) 40 associated with the zone is on (step 71). If there are enough bright pixels in the zone and the associated solid state light source(s) 40 is on, then the algorithm 61 turns the solid state light source(s) 40 off (step 73). The algorithm 61 is then done with the state light source(s) 40 for the zone (step 75) and returns back to step 69 to determine whether each solid state light source 40a-n has been controlled.

If there are not enough bright pixels in the zone and the associated solid state light source(s) 40 is on, then the algorithm 61 determines whether there are not enough bright pixels in the zone and whether the associated solid state light source(s) 40 is off (step 77). If yes, then the algorithm 61 increments a solid state light source on-counter (step 79), for example, a solid state light source on-counter stored in memory 50, and determines if the solid state light source on-counter is at a maximum (step 81). If no, then the algorithm 61 is done with the associated solid state light source(s) 40 (step 75) and returns back to step 69 to determine whether each solid state light source 40a-n has been controlled. If yes, then the algorithm 61 resets the solid state light source on-counter (step 83), turns on the associated solid state light source(s) (step 85), and is done with the associated solid state light source(s) 40 (step 75) and returns back to step 69 to determine whether each solid state light source 40a-n has been controlled.

If there are not enough bright pixels in the zone and the associated solid state light source(s) 40 is off, then the algorithm 61 determines whether there are enough bright pixels in the zone and the associated solid state light source(s) 40 is off (step 87). If yes, then the algorithm 61 resets the solid state light source on-counter (step 89), and is done with the associated solid state light source(s) 40 (step 75) and returns back to step 69 to determine whether each solid state light source 40a-n has been controlled. If no, then the algorithm 61 returns back to step 69 to determine whether each solid state light source 40a-n has been controlled.

It should be appreciated that the algorithms 31 and 61 are merely examples, and that the present disclosure is not limited to these algorithms 31 and 61 unless specifically claimed.

The ADB controller 28 may be configured to differentiate between two or more light wavelengths or light wavelength ranges (e.g., two or more colors of visible light such as a red brake light and a white headlamp light and/or between visible light and IR light). In such an embodiment, the ADB controller 28 may utilize different minimum threshold pixel brightness values (e.g., stored in the memory 50) based on the light wavelengths or light wavelength ranges in the captured image, thereby allowing the ADB controller 28 to differentiate, for example, between white light emitted by the headlamp of an on-coming vehicle and red light emitted by the taillights of another vehicle. Of course, other known methods of object detection including, but not limited to, algorithms based on CAD-like object models, appearance-based methods, feature-based methods, and/or genetic algorithms may also be used.

As described herein, a position of the digital camera 32 is fixed relative to the segmented lighting array 24 and the housing 22 and is independent of attachment of the housing 22 to the headlamp cavity 15 of the vehicle 2. The ADB controller 28 is configured to determine a position of at least one detected object 48 within the light distribution pattern 26, for example, based on algorithms 31, 61, and/or 93 (described later in combination with FIGS. 16-17). The ADB controller 28 may also be configured to identify a subset of the plurality of the solid-state light sources 40*a-n* which emit light within the light distribution pattern 26 that corresponds to the determined position of the object 48 based on the fixed position of the digital camera 32 (for example, using algorithms 31, 61, and/or 93). The ADB controller 28 may generate one or more control signals configured to cause an amount of light emitted by the identified subset of the plurality of the solid-state light sources 40*a-n* to be reduced from a first amount to a second amount, the second amount being zero or greater than zero.

For example, the light distribution pattern 26 includes a plurality of illumination regions 46*a-n* as described herein, each illumination region 46*a-n* being associated with at least one of the plurality of solid-state light sources 40*a-n*. The ADB controller 28 may include a database stored in the memory 50 identifying a fixed location range within the light distribution pattern 26 associated with each of the illumination regions 46*a-n* based on the fixed position of the digital camera 32. The ADB controller 28 may be configured to use the database stored in memory 50 to identify the subset of the plurality of the solid-state light sources 40*a-n* which emit light within the light distribution pattern 26 corresponding to the determined position of the detected object 48.

Once the ADB controller 28 has detected an object 48 within the captured image, the ADB controller 28 is configured to generate one or more control signals based, at least in part, on a position of the detected object 48 within the light distribution pattern 26, and transmit the control signal(s) to the ADB driver 30. The ADB driver 30 is configured to selectively drive one or more of the solid-state light sources (26) of the segmented lighting array (24) based on the control signal(s) from the ADB controller (28) and adjust (e.g., attenuate and/or eliminate) the brightness of one or more illumination regions (e.g., illumination region 46*b* in FIG. 8) of the light distribution pattern 26 based on a position of a detected object 48, thereby reducing and/or eliminating glare to traffic and/or pedestrians. It is important to note that the ADB controller 28 receives the image from the digital camera 32, transmits the control signal(s) to the ADB beam driver 30, and ultimately selectively drives the segmented lighting array 24 independent of (i.e., without the use of) the vehicle CAN-bus 6. Because the ADB headlamp 20 is able to function independently of the vehicle CAN-bus 6, the ADB headlamp 20 may be easily retrofitted into vehicles 2 which either do not have a CAN-bus 6 or have a CAN-bus 6 that was not specifically designed to work with the ADB headlamp 20.

Figure 11:
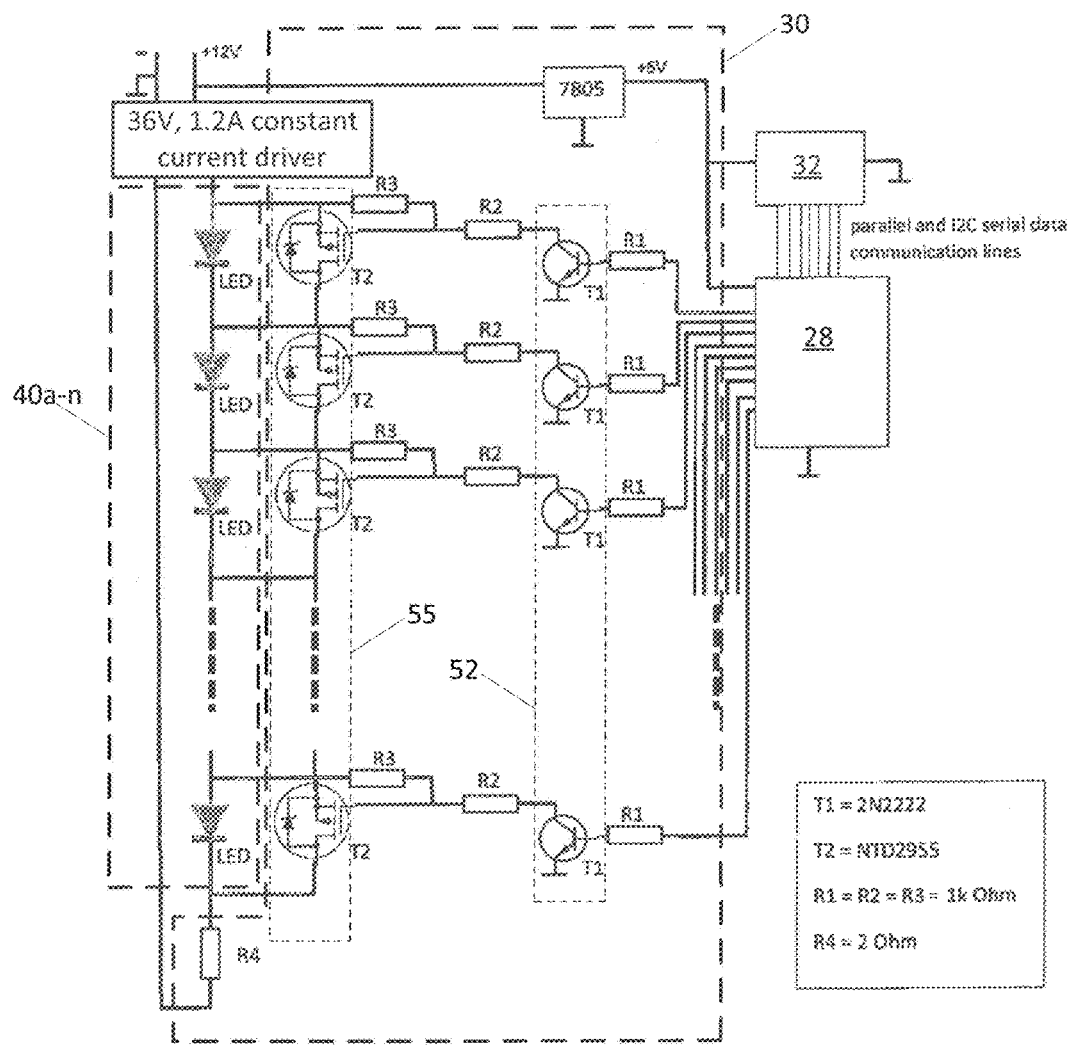
FIG. 11 illustrates one embodiment of an ADB driver consistent with the present disclosure.

Turning to FIG. 11, one embodiment of ADB driver 30 is generally illustrated. As can be seen, ADB driver 30 includes circuitry configured to selectively drive one or more of solid-state light sources 40*a-n* of segmented lighting array 24 based on the one or more control signals from ADB controller 28. The ADB driver 30 includes a plurality of MOSFETs 55 (e.g., but not limited to, p-channel MOSFETs) and transistors 52 configured to provide power and control solid-state light sources 40*a-n*. In the illustrated embodiment, each MOSFET 55 and transistor 52 is associated with a single solid-state light source 40, though it is appreciated that one or more of MOSFETs 55 and transistors 52 may control multiple solid-state light sources 40.

The ADB controller 28 transmits a control signal (such as, but not limited to, a 3.3V output signal) to a transistor 52 associated with solid-state light source(s) 40*a-n* generating the illumination region 46 corresponding to the position of the detected object 48. The plurality of solid-state light sources 40*a-n* are connected in series, and the control signal causes the transistor 52 to pull the gate of the corresponding MOSFET 55 associated with the illumination region 46 to ground. This switches the MOSFET 55, which in turn shorts the associated solid-state light source 40 thereby turning off the associated solid-state light sources 40. As a result, the brightness of a subset of one or more illumination regions 46*a-n* may be selectively adjusted, thereby reducing and/or eliminating glare to traffic and/or pedestrians. It should be appreciated that the ADB driver 30 illustrated in FIG. 11 is only one example, and that the present disclosure is not limited to this embodiment unless specifically claimed as such.

Referring back to FIG. 4, the housing 22 may optionally include a single electrical connection 60 configured to electrically couple the ADB headlamp 20 to a source of power 21 (e.g., but not limited to, one or more vehicle batteries or the like). The single electrical connection 60 may be configured to provide power to both the digital camera 32 and the segmented lighting array 24. Optionally, the single electrical connection 60 may also be configured to provide power to both ADB controller 28 and ADB driver 30 such that the single electrical connection 60 provides power to the entire ADB headlamp 20. The single electrical connection 60 allows ADB headlamp 20 to not need to be coupled to vehicle CAN-bus 6.

Figure 12:
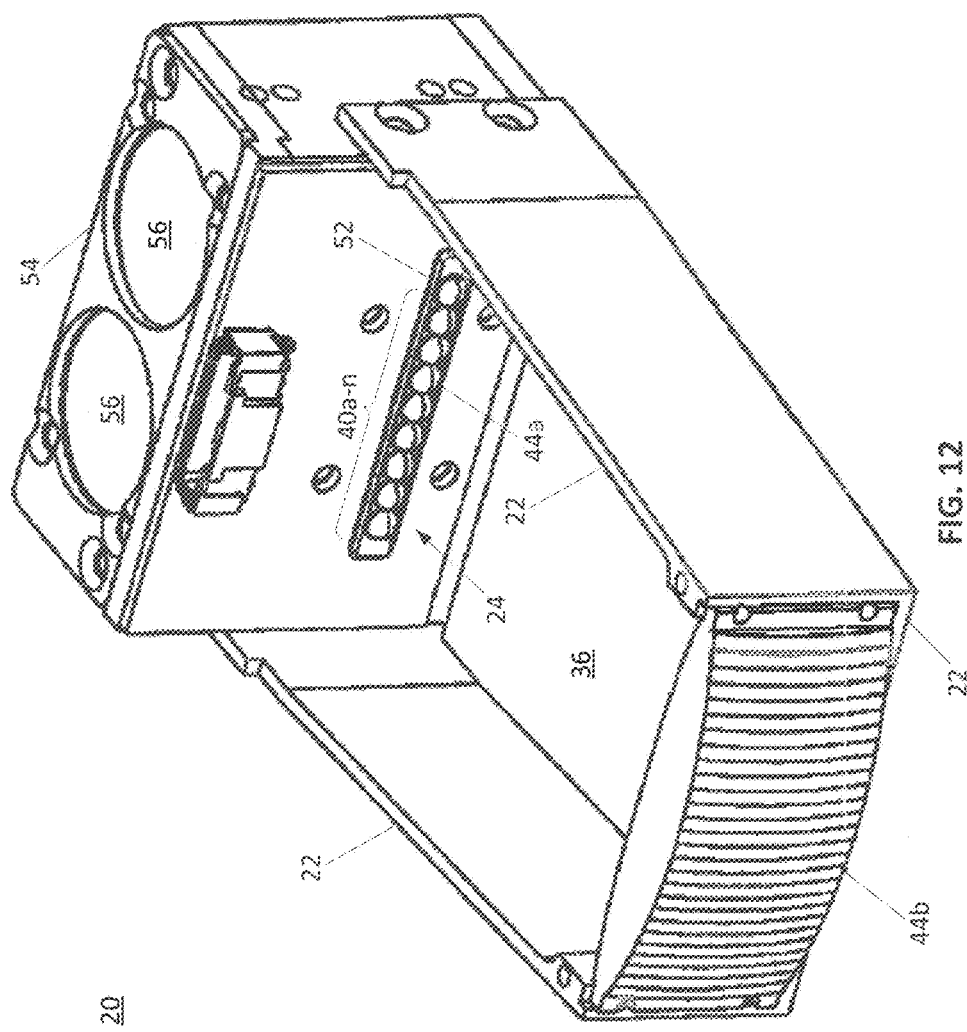
FIG. 12 illustrates one embodiment of an unassembled ADB headlamp without an ADB controller and a digital camera consistent with the present disclosure.
Figure 13:
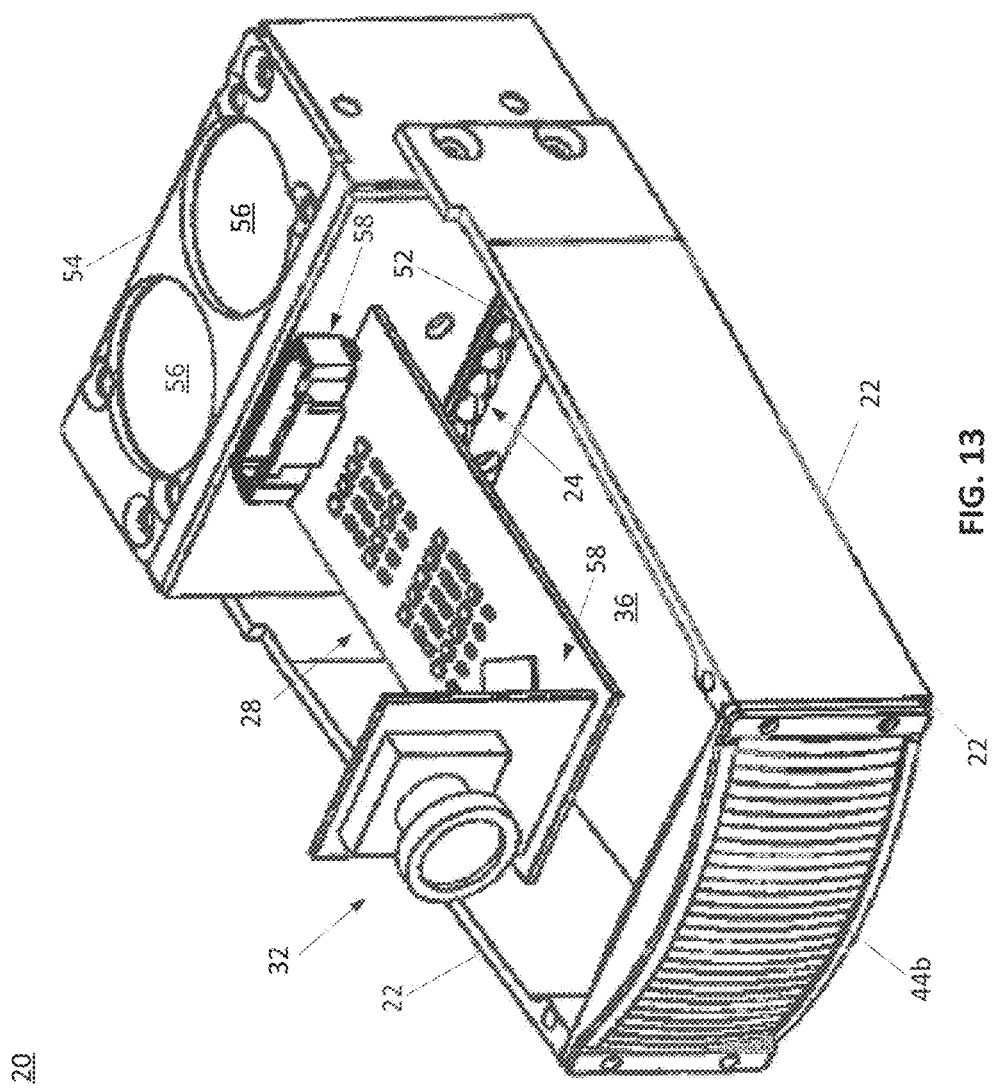
FIG. 13 illustrates the unassembled ADB headlamp of FIG. 12 including the ADB controller and the digital camera.
Figure 14:
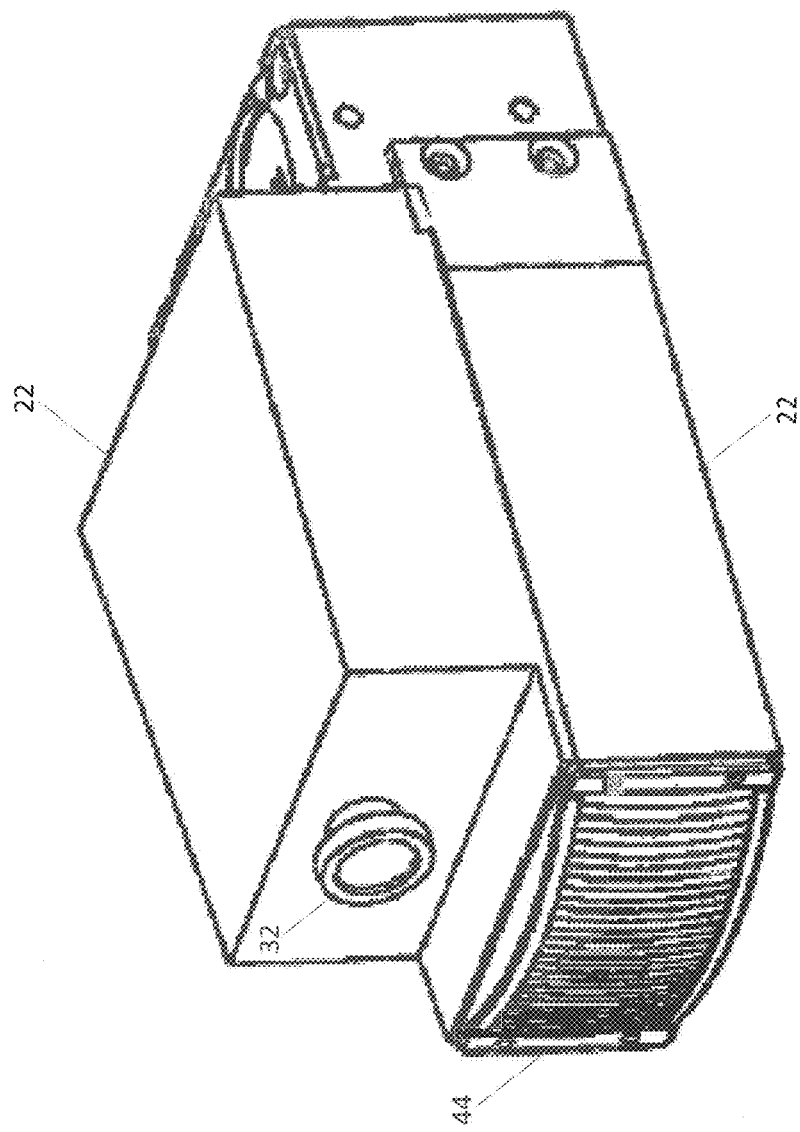
FIG. 14 illustrates one embodiment of an assembled ADB headlamp of FIG. 12.

Turning now to FIGS. 12-14, one embodiment of an ADB headlamp 20 consistent with the present disclosure is generally illustrated. In particular, FIG. 12 illustrates unassembled ADB headlamp 20 without the ADB controller 28 and the digital camera 32; FIG. 13 illustrates partially assembled ADB headlamp 20 including the ADB controller 28 and the digital camera 32; and FIG. 14 illustrates an assembled ADB headlamp 20. Turning first to FIG. 12, at least a portion of the housing 22 is shown forming a cavity or chamber 36. The segmented lighting array 24 is disposed within cavity or chamber 36 (e.g., at one end thereof), and includes a 1×9 array of a plurality of solid-state light sources 40*a-n* connected in series. In the illustrated embodiment, the plurality of solid-state light sources 40*a-n* are spaced apart 4 mm center-to-center, though this is not a limitation of the present disclosure unless specifically claimed as such. The plurality of solid-state light sources 40*a-n* each include a primary optic 44a (e.g., a lens, only one of which is labeled for clarity) configured to aid with light collection and to fill gaps between the plurality of solid-state light sources 40a-n. The light from the primary optics 44a is projected into infinity (e.g., onto the road) by a secondary optic 44b (e.g., a projector lens such as, but not limited to, an aspheric lens with a focal point in the plane of the primary optics 44a to generate the light distribution pattern 26 (not shown for clarity). The plurality of solid-state light sources 40a-n are coupled to a printed circuit board (PCB) 52, for example, a metal core board to aid in thermal dissipation, which in turn is attached to a heat sink 54 with one or more optional fans 56 (depending on the power of the solid-state light sources 40a-n).

With reference to FIG. 13, electrical circuitry 58 connects the digital camera 32 to the ADB controller 28 and connect the ADB controller 28 to the ADB driver 30 and connect the ADB driver 30 to the segmented lighting array 24. The electrical circuitry 58 is disposed in the housing 22 and includes any known circuitry including, but not limited to, PCBs, electrical connections (such as, but not limited to, USB connections), flexible wires, or the like. For example, the electrical circuitry 58 may be disposed entirely in the housing 22, therefore excluding the need to use the vehicle CAN-bus 6. It is not operationally necessary for any part of the ADB headlamp 20 to be outside of the ADB headlamp 20 (e.g., it is not operationally necessary for any part of the ADB headlamp 20 to be in the cabin 9 of the vehicle 2).

Figure 15:
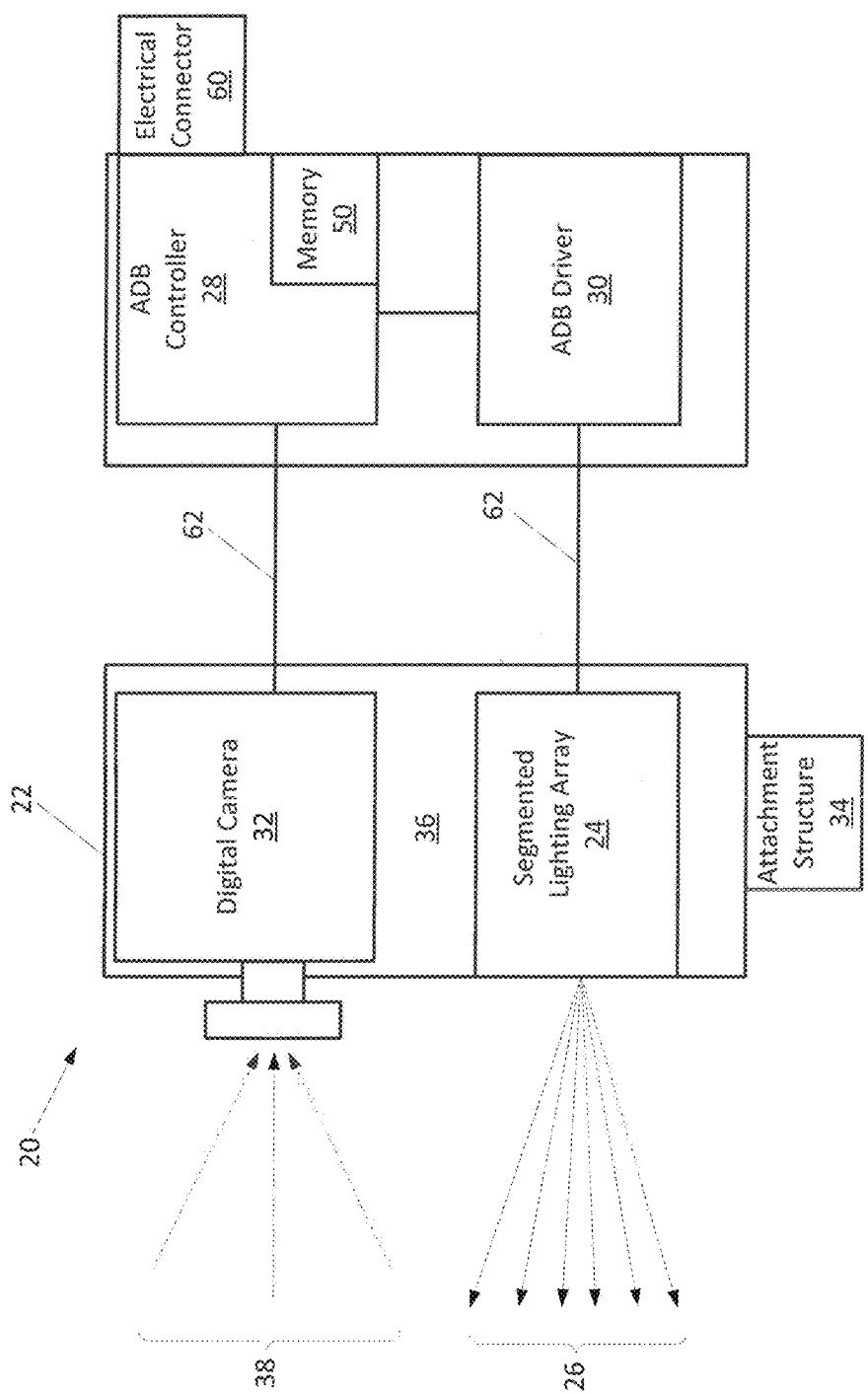
FIG. 15 illustrates one embodiment of an ADB headlamp including one or more flexible wires extending between the housing and at least one of the ADB controller or the ADB driver.

As can be seen, the digital camera 32 and the ADB controller 28 are at least partially disposed in the housing 22 (e.g., at least partially in one or more cavities or chambers 36). In the illustrated embodiment, both the ADB controller 28 and the ADB driver 30 are integral with the ADB headlamp 20; however, it should be appreciated that one or more of the ADB controller 28 or the ADB driver 30 may not be integral with the ADB headlamp 20. For example, the ADB headlamp 20 may include one or more flexible wires 62 (e.g., wires surrounded by one or more layers of insulation forming a cable) extending between the housing 22 and at least one of the ADB controller 28 or the ADB driver 30, wherein the at least one of the ADB controller 28 or the ADB driver 30 is disposed external to the housing 22 as illustrated schematically in FIG. 15.

As seen in FIG. 14, the digital camera 32 is integral with the ADB headlamp 20. For example, the digital camera is 32 supported by the housing 22 and/or is disposed at least partially in the housing 22. Because the digital camera 32 is integral with the ADB headlamp 20, the position of the digital camera 32 is fixed relative to the segmented lighting array 24 and the housing 22, and is independent of attachment of the housing 22 to the headlamp cavity 15 of the vehicle 2 (FIG. 4). As a result, the ADB controller 28 may be configured to perform calibration of the ADB headlamp 20 prior to the ADB headlamp 20 being attached to the headlamp cavity 15 of the vehicle 2 and the ADB headlamp 20 can be calibrated by the manufacturer of the ADB headlamp 20 rather than the manufacturer of the vehicle 2. Performing the calibration by the manufacturer of the ADB headlamp 20 eliminates the need to remove the vehicle 2 from the main vehicle assembly line and transport the vehicle 2 into a calibration area in order to perform calibration of the ADB headlamp 20. As a result, the additional space in the vehicle manufacturing facility may be eliminated, thus reducing the manufacturing costs of the vehicle 2 compared to the known calibration method and ADB headlamp systems 1. Moreover, since the vehicle 2 does not need to be removed from the main vehicle assembly line and transported into a calibration area, the length, complexity, and manufacturing costs of the vehicle 2 is decreased compared to the known calibration method and ADB headlamp systems 1.

Performing calibration by the manufacturer of ADB headlamp 20 also allows ADB headlamp 20 to be easily retrofitted into vehicles 2. Since calibration is performed by the manufacturer of ADB headlamp 20, the end user does not have to calibrate the ADB headlamp 20 and instead can simply install ADB headlamp 20 into headlamp cavity 15 of vehicle 2. In addition, since ADB headlamp 20 does not require a vehicle CAN-bus 6, the ADB headlamp 20 may be installed in vehicles 2 that either do not have a vehicle CAN-bus 6 or vehicles 2 that have a vehicle CAN-bus 6 which was not designed to work with an ADB headlamp.

Figure 16:
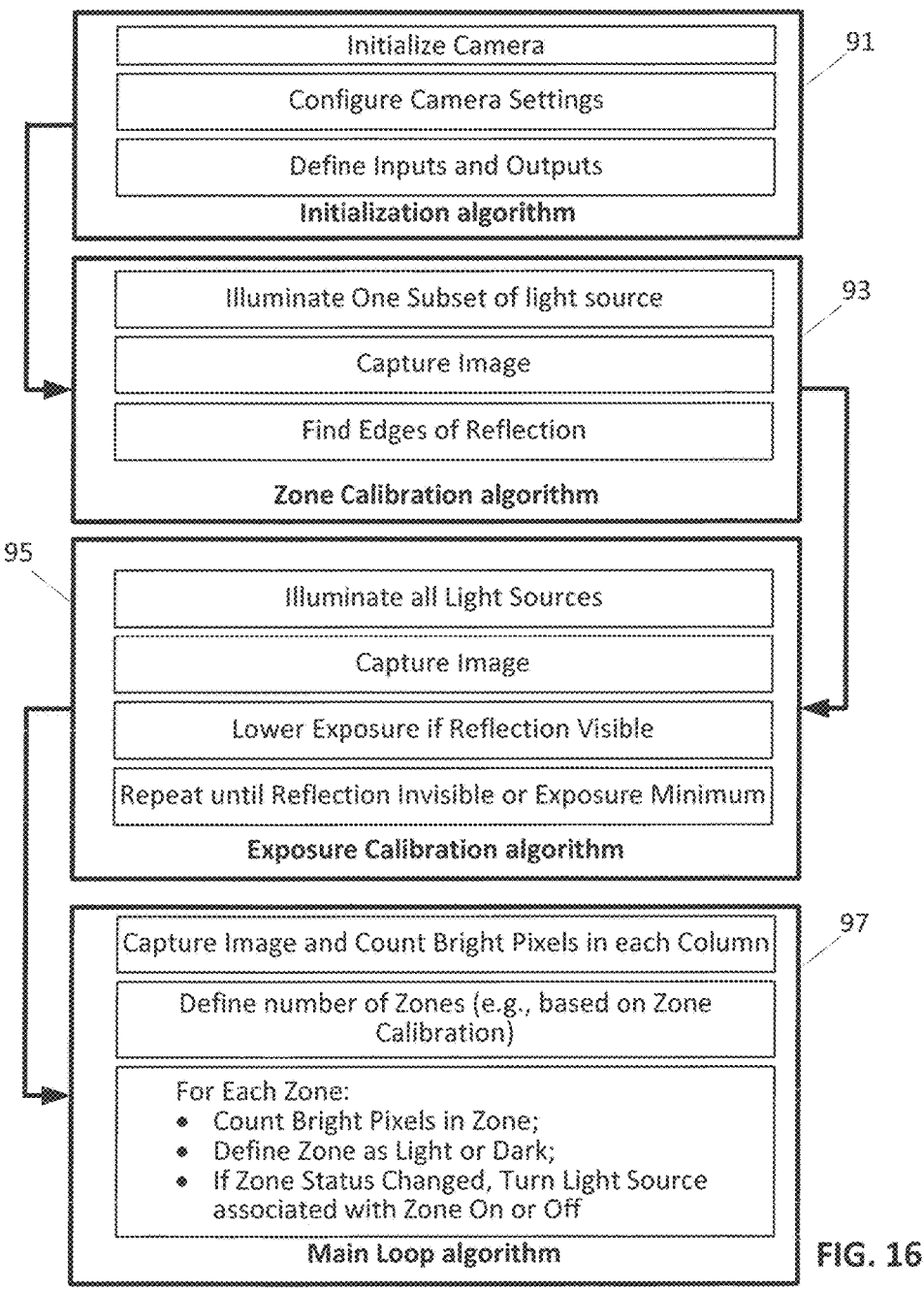
FIG. 16 illustrates one embodiment of a flow chart of algorithms that may be performed by the ADB headlamp consistent with the present disclosure.

Turning now to FIG. 16, one example of a flow chart of algorithms that may be performed by the ADB headlamp 20 (e.g., but not limited to, by the ADB controller 28) is generally illustrated. In particular, FIG. 16 includes an initialization algorithm 91, a zone calibration algorithm 93, an exposure calibration algorithm 95, and a main loop algorithm 97. The initialization algorithm 91, zone calibration algorithm 93, and exposure calibration algorithm 95 may be performed during the initial setup of the ADB headlamp 20 and do not need to be redone thereafter. Once these algorithms 91-95 are performed, the ADB headlamp 20 enters the main loop algorithm 97, which deals with the image processing algorithms. The main loop algorithm 97 runs continuously while the ADB headlamp 20 is active.

In particular, during the initialization algorithm 91 the basic operating parameters/settings for the ADB headlamp 20 are established. For example, the digital camera 32 is initialized, the settings of the digital camera 32 are configured, and the inputs and outputs of the digital camera 32, the ADB controller 28, the ADB driver 30, and/or the segmented lighting array 24 are defined.

During the zone calibration algorithm 93, the ADB controller 28 establishes the boundaries of the zones (i.e., the pixel boundaries of the plurality of illumination regions 46a-n) within an image generated by the digital camera 32. As may be appreciated, the boundaries of the zones within an image will depend on the position of the digital camera 32 relative to the segmented lighting array 24. For example, the zone calibration algorithm 93 may include illuminating a subset of the solid-state light sources 40a-n associated with a specific zone/illumination region 46, capturing an image generated by the digital camera 32, and finding/determining the edges of the zone/illumination region 46. This process is repeated for each subset of the solid-state light sources 40a-n defining a zone/illumination region 46.

The exposure calibration algorithm 95 is used by ADB controller 28 to determine (e.g., set and/or define) the maximum exposure of digital camera 32 for a given minimum pixel brightness threshold value in order to eliminate reflections. The exposure of digital camera 32 should generally be set at high as possible such that ADB controller 28 can identify object 48 within illumination pattern 26 as quickly and accurately as possible; however, if the maximum exposure is set too low, then the ADB controller 28 may falsely read reflected light as an object 48. The minimum pixel brightness threshold value may be set/determined based on empirical data, prior image processing data, historical data, and/or heuristic evaluation techniques. By way of an example, the minimum pixel brightness threshold value may be initially set to a value corresponding to the middle of the full darkness and full brightness value. The exposure calibration algorithm 95 generally includes illuminating all of the solid-state light sources 40a-n, capturing an image by the digital camera 32, determining if a reflection is detected, and if so, reducing the exposure of the digital camera 32, and repeating this process until a reflection is not visible or the digital camera 32 has reached its minimum exposure value. In the event that the minimum exposure value of the digital camera 32 has been reached and reflections have not been eliminated, the minimum pixel brightness threshold value stored in memory 50 may be increased. Use of exposure calibration algorithm 95 avoids the potential that a feedback loop could cause "flashing" of the LEDs that could otherwise result when the system sees its own reflection, turns the LEDs off, and then reacts to the dark spot by turning on the LEDs.

The main loop algorithm 97 is used by the ADB controller 28 to detect an object 48 in the light distribution pattern 26, and correlate the position of the detected object to one or more zones/illumination regions 46a-n. The main loop algorithm 97 includes generating an image using the digital camera 32, determining the number of bright pixels in each zone/illumination region 46, defining each zone/illumination region 46 as light or dark, and turning on or off the one or more (e.g., a subset) solid-state light sources 40a-n associated with each zone/illumination region 46 based on the current classification of the zone/illumination region 46 as either light or dark.

Figure 1:
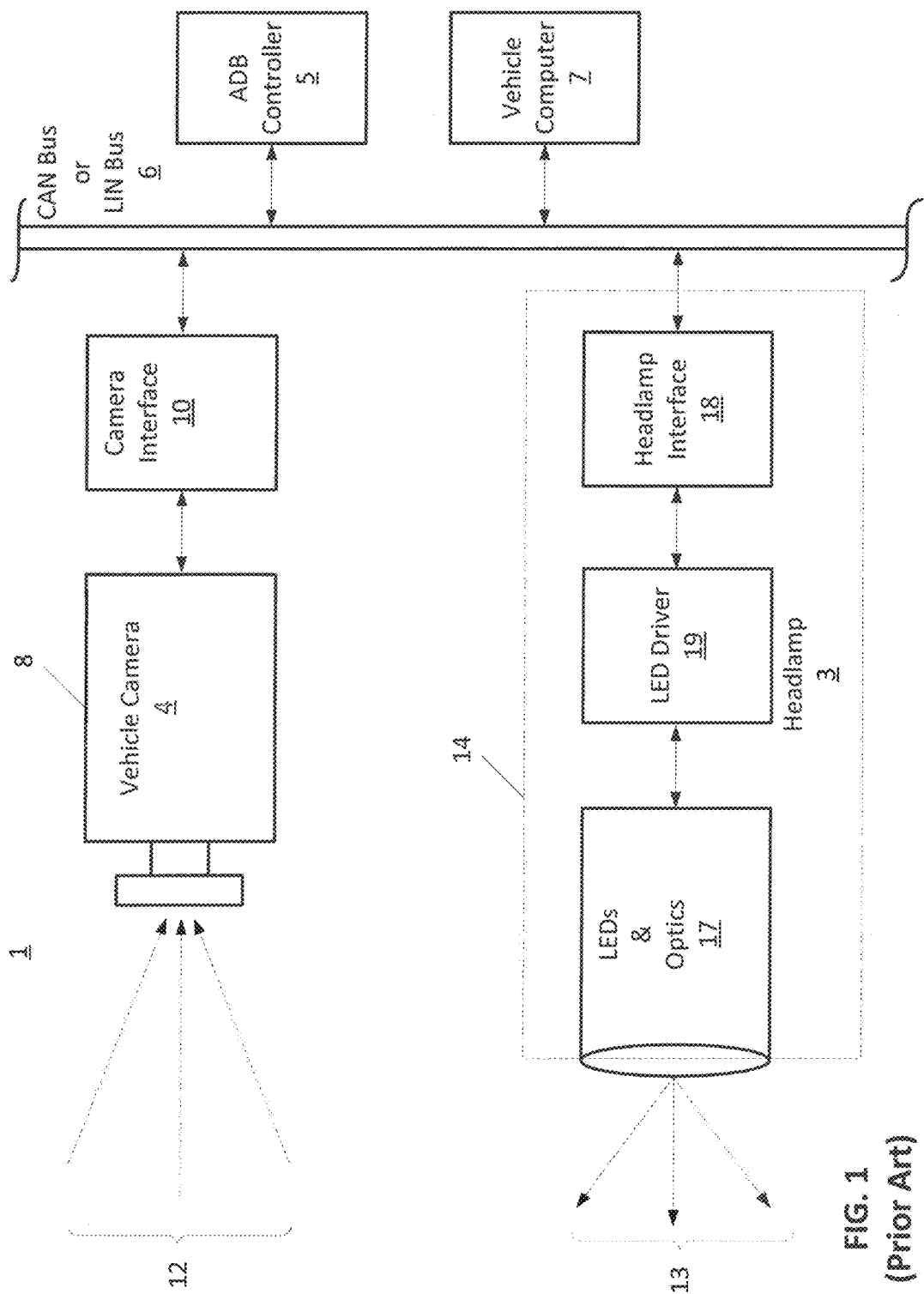
FIG. 1 is a schematic block diagram of a prior art ADB headlamp system.

With reference to FIG. 1, the known calibration methods require the on-board vehicle camera 4 to be precisely aligned with the headlamp 3 and the vehicle 2 on a pixel-by-pixel basis. In particular, the on-board vehicle camera 4 captures an image and then the edges of a zone are compared to set, predetermined pixel boundaries stored in the ADB controller 5. If the edges of the zone do not correspond to the set, predetermined pixel boundaries stored in the ADB controller 5, then the on-board vehicle camera 4 is moved to a different physical location relative to the headlamp 3 and the vehicle 2 and the process is repeated. As may be appreciated, this calibration method requires very precise physical alignment of the on-board vehicle camera 4 relative to headlamp 3 and vehicle 2, thereby significantly increasing the length and complexity of the calibration process of the prior art ADB headlamp system 1. Since the calibration of the prior art ADB headlamp system 1 is performed by the vehicle manufacturer, the manufacturing costs of the vehicle 2 are consequently increased. Moreover, end-user consumers (i.e., purchasers of the vehicle 2) may not be able to perform this type of calibration method.

According to one embodiment, the present disclosure features a zone calibration algorithm 93, FIG. 17, which does not require precise alignment of the digital camera 32 relative to the segmented lighting array 24 and is not based on set, predetermined pixel boundaries stored in memory 50. Instead, the zone calibration algorithm 93 of FIG. 17 is independent of attachment of the housing 22 to the headlamp cavity 15 of the vehicle 2 and allows the ADB controller 28 to determine and store the pixel boundaries of the zones/illumination regions 46a-n based on images captured by the digital camera 32 and the predetermined or fixed position of the digital camera 32 relative to the segmented lighting array 24 and the housing 22.

As discussed herein, the light distribution pattern 26 includes a plurality of illumination regions/zones 46a-n, each illumination region/zone 46a-n associated with a different subset of a plurality of different subsets of the plurality of solid-state light sources 40a-n. The zone calibration algorithm 93 is repeated for each zone/illumination region 46a-n. In particular, the zone calibration algorithm 93 includes turning off all of the solid-state light sources 40a-n and turning on only the solid-state light sources 40a-n associated with the zone being tested. Put another way, for each of the plurality of subsets of the plurality of solid-state light sources 40a-n, the ADB controller 28 is configured to cause a respective one of the plurality of subsets to emit light in an associated illumination region 46a-n of the light distribution pattern 26. The ADB controller 28 is further configured to cause the digital camera 32 to capture a calibration image, identify a left and a right illumination pixel boundary for the associated illumination region within the calibration image, and store data representative of the identified left and right illumination pixel boundaries into memory 50 operatively coupled to the ADB controller 28. The left illumination pixel boundary corresponds to a first column having enough number bright pixels (e.g., having at least a minimum number bright pixels) and the right illumination pixel boundary corresponds to the first column after the left edge without enough bright pixels. The ADB controller 28 may then be configured to cause data representative of the identified left and right illumination pixel boundaries to be stored into memory 50 operatively coupled to the ADB controller 28.

According to one aspect, the present disclosure includes a method of providing an ADB headlamp 20. The method includes assembling a digital camera 32, an ADB controller 28, and a segmented lighting array 24 comprising a plurality of solid-state light sources 40a-n to form the ADB headlamp 20. Prior to installing the assembled ADB headlamp 20 into a headlamp cavity 15 of a vehicle 2, the method further includes performing calibration of the ADB controller 28 based on an image captured by the digital camera 32 and a light distribution pattern 26 emitted by the plurality of solid-state light sources 40a-n, wherein the calibration is maintained after the ADB headlamp 20 is installed into the headlamp cavity 15 of the vehicle 2. As used herein, the term "maintained" is intended to mean that the ADB controller 28 does not have to be calibrated again after the ADB headlamp 20 is installed into the headlamp cavity 15 of the vehicle 2. The image generated by the digital camera 32 is transmitted from the digital camera 32 to the ADB controller 28 without using a CAN-bus 6 of the vehicle 2.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, control over dictionary definitions, definitions in documents incorporated by reference, and/or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith in compliance with the rule requiring an abstract that allows examiners and other searchers to quickly ascertain the general subject matter of the technical disclosure. It is submitted with the understanding that it will not be used to interpret or limit the scope or meaning of the claims, as set forth in the rules of the U.S. Patent and Trademark Office.

The following non-limiting reference numerals are used in the specification:

1 prior art ADB headlamp system;
2 vehicle;
3 prior art headlamp;
4 prior art vehicle on-board camera;
5 prior art ADB controller;
6 vehicle CAN-bus;
7 vehicle sensors/controllers;
8 camera housing;
9 cabin;
10 camera interface;
11 rear view mirror;
12 received light;
13 beam pattern;
14 headlamp housing;
15 headlamp cavity;
16 front;
17 LEDs/optics;
18 headlamp interface;
19 driver circuitry;
20 ADB headlamp;
21 source of power;
22 housing;
23 windshield;
24 segmented lighting array;
26 light distribution pattern;
28 ADB controller;
30 ADB driver;
31 image capture algorithm;
32 digital camera;
33 step;
34 attachment structure;
35 step;
36 chambers/cavities;
37 step;
38 light;
39 step;
40a-n solid-state light sources;
41 step;
42 light;
43 step;
44 optics;
45 step;
46a-n illumination regions/zones;
47 step;
48 object;
49 step;
50 memory;
51 step;
52 transistors;
53 step;
54 heat sink;
55 MOSFETs;
56 fan;
58 electrical circuitry;
60 electrical connection;
61 detection algorithm;
62 flexible wire;
63 step;
65 step;
67 step;
69 step;
71 step;
73 step;
75 step;
77 step;
79 step;
81 step;
83 step;
85 step;
87 step;
89 step;
91 initialization algorithm;
93 initialization algorithm;
93 calibration algorithm;
95 exposure calibration algorithm; and
97 main loop algorithm.

What is claimed is:

1. An automotive adaptive driving beam (ADB) headlamp (20), comprising:
    a housing (22) having attachment structure (34) configured for attachment to a headlamp cavity (15) of a vehicle (2);
    a digital camera (32) configured to capture an image of a region preceding the vehicle (2);
    an ADB controller (28) configured to detect at least one object (48) in the captured image and generate one or more control signals based, at least in part, on a position of the detected object (48);
    a segmented lighting array (24) disposed within the housing (22), the segmented lighting array (24) comprising a plurality of solid-state light sources (40a-n) and arranged to emit light in a light distribution pattern (26); and
    an ADB driver (30) configured to selectively drive one or more of the solid-state light sources (40a-n) of the segmented lighting array (24) based on the one or more control signals from the ADB controller (28);
    wherein the digital camera (32) is integral with the ADB headlamp (20).

2. The ADB headlamp (20) of claim 1, wherein the digital camera (32) is supported by the housing (22).

3. The ADB headlamp (20) of claim 1, wherein the digital camera (32) is disposed at least partially in the housing (22).

4. The ADB headlamp (20) of claim 1, wherein electrical circuitry (58) connecting the digital camera (32) to the ADB controller (28) and connecting the ADB controller (28) to the ADB driver (30) and connecting the ADB driver (30) to the segmented lighting array (24) is disposed in the housing (22).

5. The ADB headlamp (20) of claim 1, wherein a position of the digital camera (32) is fixed relative to the segmented lighting array (24) and to the housing (22) and is independent of attachment of the housing (22) to the headlamp cavity (15) of the vehicle (2).

6. The ADB headlamp (20) of claim 1, wherein at least one of the ADB controller (28) or the ADB driver (30) is integral with the ADB headlamp (20).

7. The ADB headlamp (20) of claim 1, further comprising one or more flexible wires (62) extending between the housing (22) and at least one of the ADB controller (28) or the ADB driver (30), wherein the at least one of the ADB controller (28) or the ADB driver (30) is disposed external to the housing (22).

8. The ADB headlamp (20) of claim 1, wherein a position of the digital camera (32) is fixed relative to the segmented lighting array (24) and to the housing (22) and independent of attachment of the housing (22) to the headlamp cavity (15) of the vehicle (2); and
wherein the ADB controller (28) is configured to determine a position of the at least one detected object (48) within the light distribution pattern (26) and identify a subset of the plurality of the solid-state light sources (40*a-n*) which emit light within the light distribution pattern (26) that correspond to the determined position of the object (48) based on the fixed position of the digital camera (32), the ADB controller (28) further configured to cause an amount of light emitted by the identified subset of the plurality of the solid-state light sources (40*a-n*) to be reduced from a first amount to a second amount.

9. The ADB headlamp (20) of claim 8, wherein the second amount is zero.

10. The ADB headlamp (20) of claim 1, wherein a position of the digital camera (32) is fixed relative to the segmented lighting array (24) and to the housing (22) and independent of attachment of the housing (22) to the headlamp cavity (15) of the vehicle (2); and
wherein the light distribution pattern (26) comprises a plurality of illumination regions (46*a-n*), each illumination region (46*a-n*) associated with at least one of the plurality of solid-state light sources (40*a-n*), wherein the ADB controller (28) includes a data stored in memory (50) identifying a fixed location range within the light distribution pattern (26) associated with each of the illumination regions (46*a-n*) based on the fixed position of the digital camera (32), wherein the ADB controller (28) uses the data to identify a subset of the plurality of the solid-state light sources (40*a-n*) which emit light within the light distribution pattern (26) corresponding to the position of the at least one detected object (48).

11. The ADB headlamp (20) of claim 1, wherein the housing (22) further comprises a single electrical connection (60) to electrically couple the ADB headlamp (20) to a source of power (21), the single electrical connection (60) further configured to provide power to both the digital camera (32) and the segmented lighting array (24).

12. The ADB headlamp (20) of claim 11, wherein the single electrical connection (60) is further configured to provide power to both the ADB controller (28) and the ADB driver (30).

13. The ADB headlamp (20) of claim 1, wherein the digital camera (32) is removably coupled to the ADB headlamp (20).

14. The ADB headlamp (20) of claim 1, wherein the ADB controller (28) is configured to perform calibration of the ADB headlamp (20) prior to the ADB headlamp (20) being attached to the headlamp cavity (15) of the vehicle (2).

15. The ADB headlamp (20) of claim 1,
wherein the light distribution pattern (26) comprises a plurality of illumination regions (46*a-n*), each illumination region (46*a-n*) associated with a different subset of a plurality of different subsets of the plurality of solid-state light sources (40*a-n*); and
wherein the ADB controller (28) is further configured, for each of the plurality of subsets, to:
cause a respective one of the plurality of subsets to emit light in an associated illumination region (46*a-n*) of the light distribution pattern (26);
cause the digital camera (32) to capture a calibration image;
identify a left and a right illumination pixel boundary for the associated illumination region (46*a-n*) within the calibration image; and
store data representative of the identified left and right illumination pixel boundaries into memory (50) operatively coupled to the ADB controller (28).

16. The ADB headlamp (20) of claim 1 in combination with the vehicle (2) having a headlamp cavity (15) and an occupant cabin (9), wherein the digital camera (32) is attached to the headlamp cavity (15) of the vehicle (15) and is disposed external to the occupant cabin (9) of the vehicle (2).

17. The ADB headlamp (20) of claim 1, wherein the digital camera (32) is configured to transmit data of the captured image to the ADB controller (28) independent of a CAN-bus (6) of the vehicle (2).

18. The ADB headlamp (20) of claim 1,
wherein a distance between the digital camera (32) and the segmented lighting array (24) defines a preset camera-light array separation; and
the ADB controller (28) is programmed with a zone calibration algorithm (93) that defines boundaries between illuminated regions (46*a-n*) in the light distribution pattern (26) dependent on said preset camera-light array separation, whereby each said illuminated region (46*a-n*) is generated by illuminated sequential subsets of the plurality of solid-state lighting sources (40*a-n*).

19. The ADB headlamp (20) of claim 1 in combination with a second said ADB headlamp (20), the first and second ADB headlamps collectively defining an ADB headlamp lighting system for the vehicle, said second ADB headlamp (20) comprising:
a second housing (22) having second attachment structure (34) configured for attachment to a second headlamp cavity (15) of the vehicle (2);
a second digital camera (32) configured to capture an image of a region preceding the vehicle (2);
a second ADB controller (28) configured to detect at least one object (48) in the captured image and generate one or more control signals based, at least in part, on a position of the detected object (48);
a second segmented lighting array (24) disposed within the second housing (22), the second segmented lighting array (24) comprising a second plurality of solid-state light sources (40*a-n*) and arranged to emit light in a second light distribution pattern (26); and a second ADB driver (30) configured to selectively drive one or more of the second solid-state light sources (40a-n) of the second segmented lighting array (24) based on the one or more control signals from the second ADB controller (28);
wherein the second digital camera (32) is integral with the second ADB headlamp (20).

20. A method of providing an automotive adaptive driving beam (ADB) headlamp (20), the method comprising:
assembling a digital camera (32), an ADB controller (28), and a segmented lighting array (24) comprising a plurality of solid-state light sources (40a-n) to form the ADB headlamp (20); and
prior to installing the assembled ADB headlamp (20) into a headlamp-receiving surface (15) of a vehicle (2), performing calibration of the ADB controller (28) based on an image captured by the digital camera (32) and a light distribution pattern (26) emitted by the plurality of solid-state light sources (40a-n), wherein the calibration is maintained after the ADB headlamp (20) is installed into the headlamp-receiving surface of the vehicle (2).

21. The method of claim 20, wherein the image is transmitted from the digital camera (32) to the ADB controller (28) without using a CAN-bus (6) of the vehicle (2).

22. The method of claim 20, further comprising installing the assembled ADB headlamp (20) into the headlamp-receiving surface of the vehicle (2).

23. The method of claim 20, wherein the light distribution pattern (26) comprises a plurality of illumination regions (46a-n), each illumination region (46a-n) associated with a different subset of a plurality of different subsets of the plurality of solid-state light sources (40a-n); and
wherein for each of the plurality of subsets, performing calibration of the ADB controller (28) includes:
causing a respective one of the plurality of subsets to emit light in an associated illumination region (46a-n) of the light distribution pattern (26);
causing the digital camera (32) to capture a calibration image;
identifying a left and a right illumination pixel boundary for the associated illumination region (46a-n) within the calibration image; and
storing data representative of the identified left and right illumination pixel boundaries into memory (50) operatively coupled to the ADB controller (28).

24. The method of claim 22, wherein the headlamp-receiving surface is a headlamp cavity (15) of the vehicle (2).

25. An automotive adaptive driving beam (ADB) lamp (20), comprising:
a housing (22) having attachment structure (34) configured for attachment to a lamp-receiving surface of a vehicle (2);
a digital camera (32) configured to capture an image of a region preceding the vehicle (2);
an ADB controller (28) configured to detect at least one object (48) in the captured image and generate one or more control signals based, at least in part, on a position of the detected object (48);
a segmented lighting array (24) disposed within the housing (22), the segmented lighting array (24) comprising a plurality of solid-state light sources (40a-n) and arranged to emit light in a light distribution pattern (26); and
an ADB driver (30) configured to selectively drive one or more of the solid-state light sources (40a-n) of the segmented lighting array (24) based on the one or more control signals from the ADB controller (28);
wherein the digital camera (32) is integral with the ADB lamp (20).

26. The ADB lamp (20) of claim 25, wherein the digital camera (32) is supported by the housing (22).

27. The ADB lamp (20) of claim 25, wherein the digital camera (32) is disposed at least partially in the housing (22).

28. The ADB lamp (20) of claim 25, wherein electrical circuitry (58) connecting the digital camera (32) to the ADB controller (28) and connecting the ADB controller (28) to the ADB driver (30) and connecting the ADB driver (30) to the segmented lighting array (24) is disposed in the housing (22).

29. The ADB lamp (20) of claim 25, wherein a position of the digital camera (32) is fixed relative to the segmented lighting array (24) and to the housing (22) and is independent of attachment of the housing (22) to the lamp-receiving surface of the vehicle (2).

30. The ADB lamp (20) of claim 25, wherein at least one of the ADB controller (28) or the ADB driver (30) is integral with the ADB lamp (20).

31. The ADB lamp (20) of claim 25, further comprising one or more flexible wires (62) extending between the housing (22) and at least one of the ADB controller (28) or the ADB driver (30), wherein the at least one of the ADB controller (28) or the ADB driver (30) is disposed external to the housing (22).

32. The ADB lamp (20) of claim 25, wherein a position of the digital camera (32) is fixed relative to the segmented lighting array (24) and to the housing (22) and independent of attachment of the housing (22) to the lamp-receiving surface of the vehicle (2); and
wherein the ADB controller (28) is configured to determine a position of the at least one detected object (48) within the light distribution pattern (26) and identify a subset of the plurality of the solid-state light sources (40a-n) which emit light within the light distribution pattern (26) that correspond to the determined position of the object (48) based on the fixed position of the digital camera (32), the ADB controller (28) further configured to cause an amount of light emitted by the identified subset of the plurality of the solid-state light sources (40a-n) to be reduced from a first amount to a second amount.

33. The ADB lamp (20) of claim 32, wherein the second amount is zero.

34. The ADB lamp (20) of claim 25, wherein a position of the digital camera (32) is fixed relative to the segmented lighting array (24) and to the housing (22) and independent of attachment of the housing (22) to the lamp-receiving surface of the vehicle (2); and
wherein the light distribution pattern (26) comprises a plurality of illumination regions (46a-n), each illumination region (46a-n) associated with at least one of the plurality of solid-state light sources (40a-n), wherein the ADB controller (28) includes a data stored in memory (50) identifying a fixed location range within the light distribution pattern (26) associated with each of the illumination regions (46a-n) based on the fixed position of the digital camera (32), wherein the ADB controller (28) uses the data to identify a subset of the plurality of the solid-state light sources (40a-n) which emit light within the light distribution pattern (26) corresponding to the position of the at least one detected object (48).

35. The ADB lamp (20) of claim 25, wherein the housing (22) further comprises a single electrical connection (60) to electrically couple the ADB lamp (20) to a source of power (21), the single electrical connection (60) further configured to provide power to both the digital camera (32) and the segmented lighting array (24).

36. The ADB lamp (20) of claim 35, wherein the single electrical connection (60) is further configured to provide power to both the ADB controller (28) and the ADB driver (30).

37. The ADB lamp (20) of claim 25, wherein the digital camera (32) is removably coupled to the ADB lamp (20).

38. The ADB lamp (20) of claim 25, wherein the ADB controller (28) is configured to perform calibration of the ADB lamp (20) prior to the ADB lamp (20) being attached to the lamp-receiving surface of the vehicle (2).

39. The ADB lamp (20) of claim 25,
wherein the light distribution pattern (26) comprises a plurality of illumination regions (46a-n), each illumination region (46a-n) associated with a different subset of a plurality of different subsets of the plurality of solid-state light sources (40a-n); and
wherein the ADB controller (28) is further configured, for each of the plurality of subsets, to:
cause a respective one of the plurality of subsets to emit light in an associated illumination region (46a-n) of the light distribution pattern (26);
cause the digital camera (32) to capture a calibration image;
identify a left and a right illumination pixel boundary for the associated illumination region (46a-n) within the calibration image; and
store data representative of the identified left and right illumination pixel boundaries into memory (50) operatively coupled to the ADB controller (28).

40. The ADB lamp (20) of claim 25, wherein the attachment structure is configured for attachment to a headlamp cavity (15) of the vehicle (2).

* * * * *